(12) United States Patent
Weiss et al.

(10) Patent No.: US 12,718,620 B2
(45) Date of Patent: Aug. 25, 2026

(54) EXTRACTION OF HUMAN POSES FROM VIDEO DATA FOR ANIMATION OF COMPUTER MODELS

(71) Applicant: Roblox Corporation, San Mateo, CA (US)

(72) Inventors: Alexander B. Weiss, Pleasanton, CA (US); Timothy Paul Omernick, San Diego, CA (US); Tinghui Zhou, Castro Valley, CA (US)

(73) Assignee: Roblox Corporation, San Mateo, CA (US)

( * ) Notice: Subject to any disclaimer, the term of this patent is extended or adjusted under 35 U.S.C. 154(b) by 433 days.

(21) Appl. No.: 18/217,142

(22) Filed: Jun. 30, 2023

(65) Prior Publication Data

US 2025/0005965 A1 Jan. 2, 2025

(51) Int. Cl.

*G06V 40/20* (2022.01)
*G06T 13/40* (2011.01)
*G06V 10/774* (2022.01)

(52) U.S. Cl.

CPC .............. *G06V 40/23* (2022.01); *G06T 13/40* (2013.01); *G06V 10/774* (2022.01)

(58) Field of Classification Search

CPC ...... G06V 40/23; G06V 10/774; G06T 13/40; G06T 2207/20084; G06T 2207/30196

See application file for complete search history.

(56) References Cited

U.S. PATENT DOCUMENTS 10,911,775 B1 * 2/2021 Zhu ...................... H04N 19/513
11,127,163 B2 * 9/2021 Hesse .................. G06T 17/205
12,303,255 B1 5/2025 Schnan Mastronardi et al.
2005/0001842 A1 * 1/2005 Park ...................... G06F 30/20 345/474

(Continued)

OTHER PUBLICATIONS

Bogo, et al., "Keep it SMPL: Automatic Estimation of 3D Human Pose and Shape from a Single Image", Computer Vision—ECCV 2016: 14th European Conference, Amsterdam, The Netherlands, Oct. 11-14, 2016, 18 pages.

(Continued)

*Primary Examiner* — Kee M Tung
*Assistant Examiner* — Nauman U Ahmad
(74) *Attorney, Agent, or Firm* — IP Spring

(57) ABSTRACT

Extraction of human poses from video data for animation of computer models. In some implementations, a computer-implemented method includes determining a first pose sequence of a human body model based on frames of an input video, the frames depicting movement of a person. The first pose sequence includes poses of the human body model that correspond to the video frames. The first pose sequence is updated to produce a second pose sequence, including, over multiple iterations, determining joint velocities of joints of the pose sequence, determining, in parallel, predicted poses from each of multiple poses of the pose sequence by encoding the joint velocities into parameters of a human motion prior, and based on comparing corresponding predicted poses, adjusting joint angles of the pose sequence. The second pose sequence can provide an animation of a computer model corresponding to the movement of the person in the input video.

20 Claims, 9 Drawing Sheets

(56) References Cited

U.S. PATENT DOCUMENTS

| | | | | |
|---|---|---|---|---|
| 2013/0238295 | A1* | 9/2013 | Hyung | G06T 7/251 703/2 |
| 2016/0360194 | A1* | 12/2016 | Kudrolli | H04N 23/50 |
| 2020/0410736 | A1* | 12/2020 | Lu | G06N 3/094 |
| 2021/0118173 | A1* | 4/2021 | Wu | G06T 7/74 |
| 2022/0051471 | A1 | 2/2022 | Logothetis et al. | |
| 2024/0296579 | A1* | 9/2024 | Zhu | G06T 7/75 |
| 2024/0296585 | A1 | 9/2024 | Lee et al. | |
| 2025/0225709 | A1* | 7/2025 | Zhang | G06T 17/00 |

OTHER PUBLICATIONS

Kanazawa, et al., "End-to-end Recovery of Human Shape and Pose", Proceedings of the IEEE conference on computer vision and pattern recognition, 2018, 10 pages.

Kocabas, et al., "VIBE: Video Inference for Human Body Pose and Shape Estimation", Proceedings of the IEEE/CVF conference on computer vision and pattern recognition, 2020, 12 pages.

Loper, et al., "SMPL: A Skinned Multi-Person Linear Model", ACM Transactions on Graphics, vol. 34, Issue 6, Article No. 248, Nov. 2015, pp. 1-16.

Pavlakos, et al., "Expressive Body Capture: 3D Hands, Face, and Body from a Single Image", Computer Vision and Pattern Recognition (CVPR), Long Beach, CA, 2019, 22 pages.

Rempe, et al., "HuMoR: 3D Human Motion Model for Robust Pose Estimation", International Conference on Computer Vision (ICCV), 2021, 25 pages.

Shimada, et al., "PhysCap: Physically Plausible Monocular 3D Motion Capture in Real Time", ACM Transactions on Graphics (ToG) 39.6, 2020, pp. 1-16.

Sun, et al., "Monocular, One-stage, Regression of Multiple 3D People", Proceedings of the IEEE/CVF international conference on computer vision, 2021, 17 pages.

Zhou, et al., "Spatio-temporal Matching for Human Pose Estimation in Video", IEEE Transactions on Pattern Analysis and Machine Intelligence, Jan. 2015, 14 pages.

Bertasius, et al., "Is Space-Time Attention All You Need for Video Understanding?", ICML. vol. 2. No. 3, 2021, 3 pages.

Cetin, Doruk, "Learning In-The-Wild Temporal 3D Pose Estimation from MoCap Data," www.research-collection.ethz.ch/bitstreams/dd0a1870-7c21-438e-a7e4-59432cf0ae06/download, 2020, 56 pages.

Liu, Caihong et al., "Fast Tracking Algorithm Based on Spatial Regularization Correlation Filter," https://doi.org/10.3390/info13040184, 2022, 20 pages.

Mafia Game Videos, "Behind the Scenes—Mafia 3 John Donovan Mocap Footage (Lane Compton)," video; www.youtube.com/watch?v=07U9sg2zsIU, 2020 (video).

USPTO, Non-final Office Action for U.S. Appl. No. 18/814,072, Apr. 22, 2026, 16 pages.

* cited by examiner

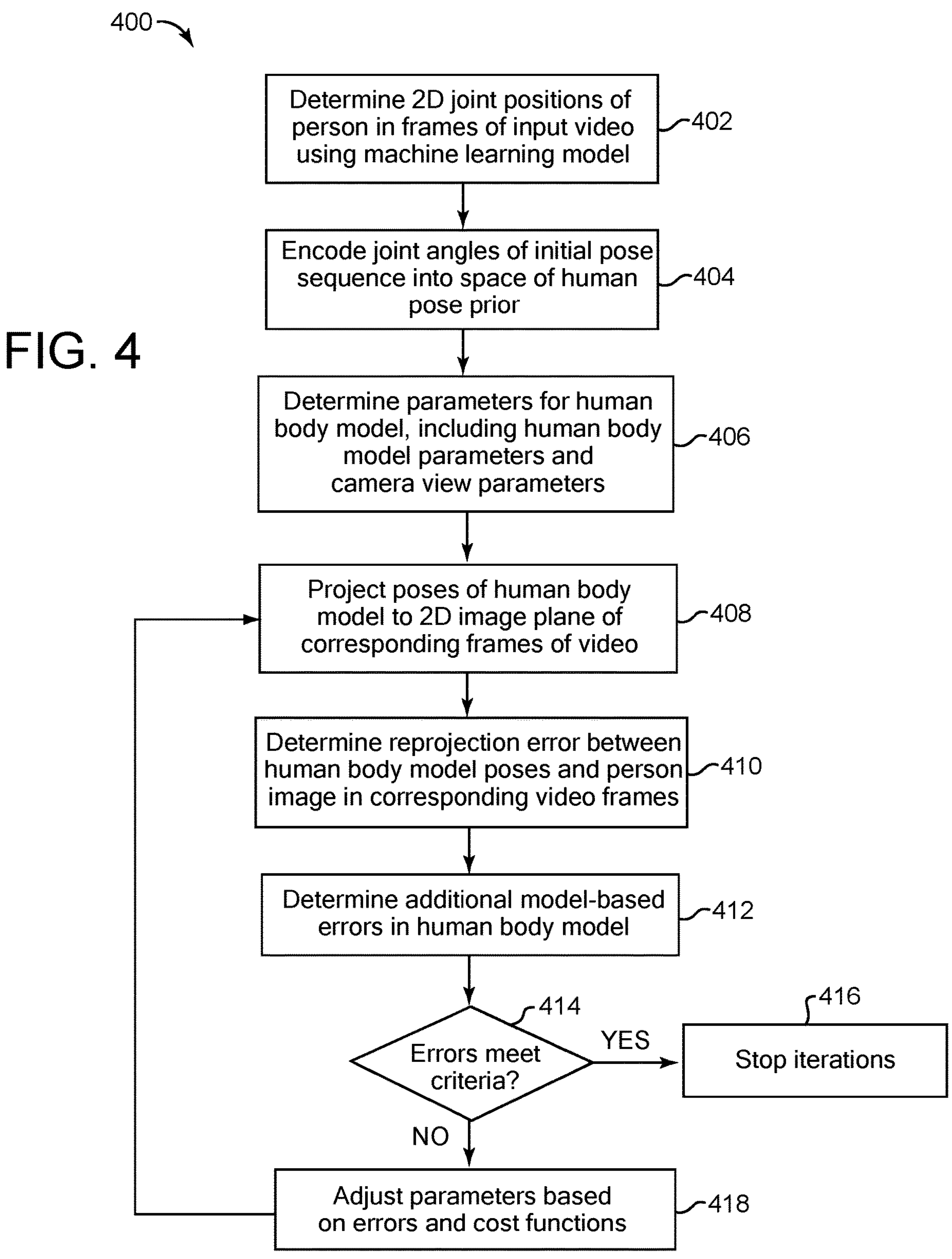
400
FIG. 4
Determine 2D joint positions of person in frames of input video using machine learning model
402
Encode joint angles of initial pose sequence into space of human pose prior
404
Determine parameters for human body model, including human body model parameters and camera view parameters
406
Project poses of human body model to 2D image plane of corresponding frames of video
408
Determine reprojection error between human body model poses and person image in corresponding video frames
410
Determine additional model-based errors in human body model
412
Errors meet criteria?
414
YES
Stop iterations
416
NO
Adjust parameters based on errors and cost functions
418

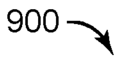
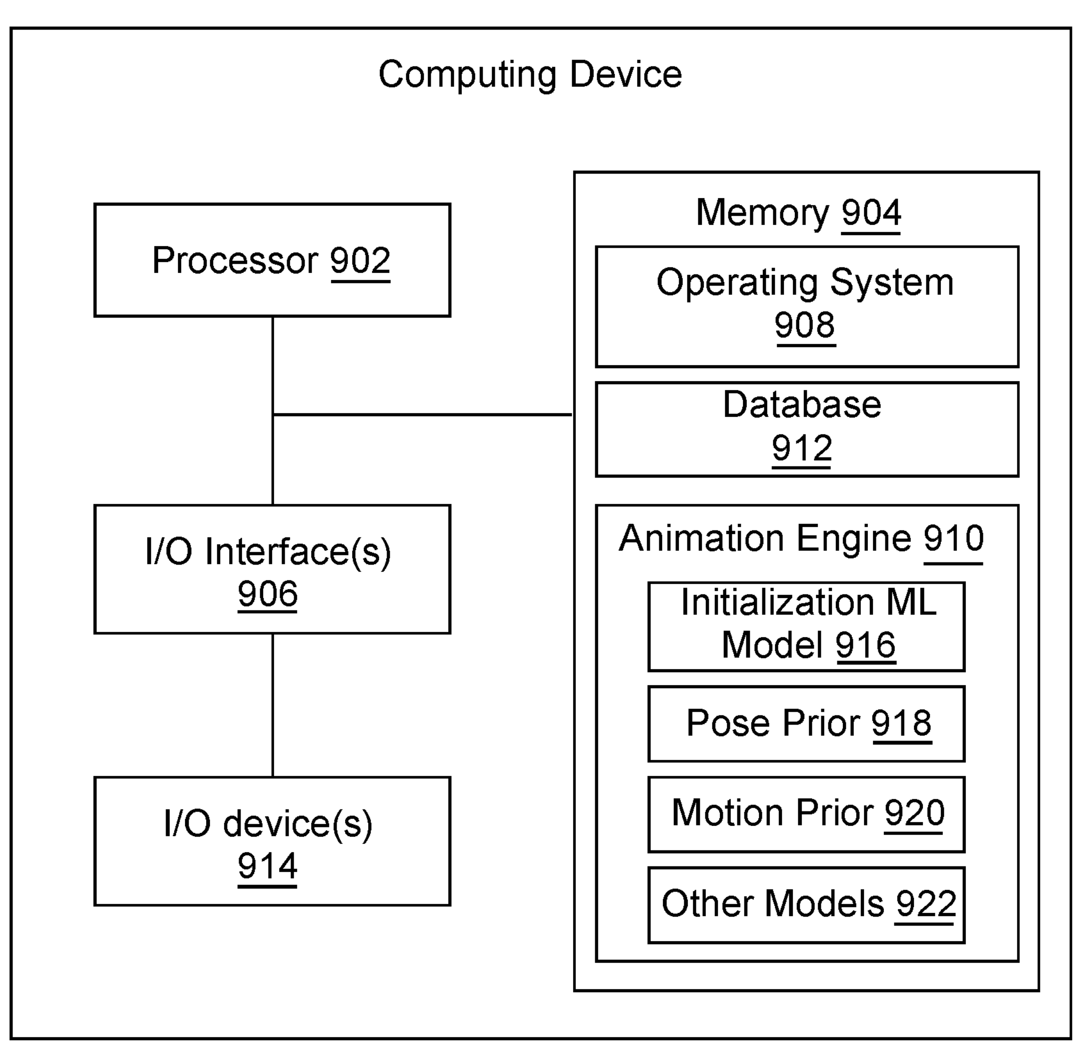
FIG. 9

EXTRACTION OF HUMAN POSES FROM VIDEO DATA FOR ANIMATION OF COMPUTER MODELS

TECHNICAL FIELD

This disclosure relates to the field of animation of computer models in computer environments and, in particular, to methods, systems, and computer readable media for extracting movement of persons from video data for animation for computer models.

BACKGROUND

Animations of three-dimensional (3D) computer-generated models are used in a variety of applications including the presentation of motion of characters (avatars) and objects in computer environments such as in games, movies, etc. Manually creating high-quality animations for computer models is an expensive and time consuming process, often requiring specialized skill sets and hours of manual labor. Techniques such as motion capture have been devised, in which a computer model of a person mimics motion of a corresponding real person that is captured using sensor devices that detect and record the person's motion. The computer model is animated to follow the motion of the physical person based on the captured motion data. However, motion capture is expensive and difficult to set up.

Advances in machine learning have led to other techniques involving motion capture and resulting animation based solely on camera images. In some techniques, the motion of a person depicted in sequential images such as a video can be determined and transferred to a computer model, such that the computer model copies the motion depicted in the video. Motion depicted in a two-dimensional video is converted to three dimensions and transferred to the computer model. However, current machine learning techniques for motion capture from images produce low-quality animations. Techniques have been used to estimate human poses from video, but these provide jittery or over-damped motion. Furthermore, such techniques require significant computer processing for long periods of time before a resulting animated computer model is provided. Such significant processing requirements and wait times are costly in terms of computer resources and unsuitable for some applications such as user-created animations used in games and other computer environments.

Accordingly, there may exist a need for improved and more efficient and accurate extraction of human poses from video to provide high-quality animations of computer models with relatively short processing times.

The background description provided herein is to present the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to extraction of human poses from video data for animation of computer models. In some implementations, a computer-implemented method includes determining, by at least one processor, a first pose sequence of a human body model based on image data of frames of an input video. The frames include pixels depicting movement of a person, and the first pose sequence includes a plurality of poses of the human body model that correspond to the frames of the input video, each pose described by parameters including joint angles of joints of the human body model. The method includes updating, by the at least one processor, the first pose sequence to produce a second pose sequence of the human body model. The updating includes, over a plurality of iterations: determining joint velocities of joints of a processed pose sequence, wherein the processed pose sequence is initially the first pose sequence; determining, in parallel, predicted poses from each of multiple poses of the processed pose sequence by encoding the joint velocities into parameters of a space of a human motion prior and decoding the parameters; comparing corresponding predicted poses; and based on the comparison, adjusting joint angles of the processed pose sequence, wherein the processed pose sequence is the second pose sequence after the plurality of iterations. The second pose sequence is applied to a computer model in a computer-generated environment to cause an animation of the computer model based on the second pose sequence and corresponding to the movement of the person in the input video.

Various implementations and examples of the method are described. For example, in some implementations, determining the predicted poses from each of the multiple poses includes, for each pose of the processed pose sequence, determining a chain of predicted poses in parallel, wherein each predicted pose in the chain is determined based on a previous pose in the chain, and wherein comparing corresponding predicted poses includes comparing the corresponding predicted poses of different chains of predicted poses. In some implementations, determining the predicted poses from each of the multiple poses includes, for each predicted pose, encoding joint velocities of the previous pose into the parameters of the space of the human motion prior and decoding the parameters to obtain the predicted pose.

In some implementations, updating the first pose sequence includes determining a consistency error between the corresponding predicted poses, wherein adjusting the joint angles is based on the consistency error. In some implementations, determining the predicted poses from each of the multiple poses includes adding a delta velocity parameter to the parameters of the space of the human motion prior, and further comprising adjusting the delta velocity parameter based on the comparison of the corresponding predicted poses. In some implementations, updating over the plurality of iterations is stopped in response to deviations between the corresponding predicted poses meeting one or more thresholds. In some implementations, determining the joint velocities includes determining a distance that each joint moves between the predicted pose and a previous pose of the processed pose sequence.

In some implementations, for each pose of the plurality of poses, a plurality of parameters indicates relative joint angles of joints of the human body model. In some implementations, determining the first pose sequence is performed using at least one machine learning model that is trained on a plurality of videos depicting movement of persons. In some implementations, determining the first pose sequence further comprises: determining, by the at least one processor, an initial pose sequence based on the machine learning model; updating, by the at least one processor, the initial pose sequence to produce the first pose sequence, wherein updating the initial pose sequence to produce the first pose sequence includes: determining, by the at least one processor, positions of joints of the person depicted in the frames of the input video; projecting the poses of the human body model from a three-dimensional space to a two-dimensional plane; determining a reprojection error based on differences between positions of joints of the projected poses of the human body model and the positions of joints of the person in the frames of the input video; and iteratively adjusting one or more parameters of the initial pose sequence based on the reprojection error to produce the first pose sequence.

In some implementations, the method further includes determining one or more additional errors in poses of the initial pose sequence, wherein the additional errors include one or more of: an off-balance orientation of one or more of the poses in the initial pose sequence; a position of one or more of the poses relative to a floor plane; joint velocities of body joints in the initial pose sequence being over a threshold; or a body shape of the human body model of the initial pose sequence being outside a particular range of shapes, wherein iteratively adjusting the one or more parameters of the initial pose sequence is further based on the additional errors. In some implementations, iteratively adjusting one or more parameters of the human body model can be additionally based on one or more cost functions. The cost functions can include, for example, a cost function that assigns greater cost to rotations of body joints of the human body model that do not conform to a human skeleton, and/or a cost function that assigns greater costs to shapes that are outside a predetermined range of shapes.

In some implementations, a system comprising at least one processor coupled to a memory having stored thereon software instructions that, when executed by the at least one processor, cause the at least one processor to perform operations. The operations can include determining, e.g., using a machine learning model, a first pose sequence of a human body model based on image data in frames of an input video, wherein the frames include pixels depicting movement of a person, and wherein the first pose sequence includes a plurality of poses of the human body model that correspond to the frames of the input video. The first pose sequence is updated to produce a second pose sequence, wherein updating the first pose sequence includes: projecting the poses of the human body model from a three-dimensional space to a two-dimensional plane; determining a reprojection error based on differences between positions of joints of the projected poses of the human body model and positions of the joints of the person in the frames of the input video; and adjusting one or more parameters of the first pose sequence based on the reprojection error to produce the second pose sequence, wherein one or more constraints are imposed on the adjusting the one or more parameters, the one or more constraints including constraining movement of a camera view of the human body model. Poses that are based on the second pose sequence are applied to a computer model in a computer-generated environment, wherein the poses applied in sequence cause an animation of the computer model that corresponds to the movement of the person in the input video.

Various implementations and examples of the system are described. For example, in some implementations, the operation of adjusting the one or more parameters includes iteratively adjusting the one or more parameters based on the reprojection error until the reprojection error is below a threshold, and wherein the one or more parameters include joint angle parameters, body shape parameters, root translation parameters, and camera view parameters. In some implementations, the one or more constraints include a horizontal plane on which the human body model is positioned for the poses in the second pose sequence. In some implementations, the one or more constraints include restricting the movement of the camera view to five degrees of freedom, the five degrees of freedom not including rotation of the camera view about a vertical axis. In some implementations, the operation of adjusting the one or more parameters is additionally based on one or more cost functions, e.g., a cost function that assigns greater cost to loss of contact of the human body model with a horizontal floor, including moving of the human body model down through a plane of a floor plane and/or movement of feet portions of the human body model at least a threshold distance above the floor plane. In some implementations, a cost function assigns greater cost to a center of mass of the human body model, for a threshold period of time, being tilted from a vertical direction by at least a threshold angle. In some implementations, a cost functions assigns greater cost to sequential poses of the pose sequence in which the human body model or portion of the human body model moves between poses at a speed over a threshold velocity.

In some implementations, the operations further include updating the second pose sequence to produce a third pose sequence of the human body model, wherein the updating includes, over a plurality of iterations, determining joint velocities of joints of a processed pose sequence, wherein the processed pose sequence is initially the second pose sequence; determining, in parallel, predicted poses from each of multiple poses of the processed pose sequence by encoding the joint velocities into parameters of a space of a human motion prior and decoding the parameters; comparing corresponding predicted poses; and based on the comparison, adjusting joint angles of the processed pose sequence, wherein the processed pose sequence is the third pose sequence after the plurality of iterations, and wherein applying poses that are based on the second pose sequence includes applying the third pose sequence to the computer model to cause the animation of the computer model based on the third pose sequence.

In some implementations, updating the first pose sequence includes determining, using an image detector machine learning model, positions of joints of the person depicted in the frames of the input video. In some implementations, the operation of determining the first pose sequence includes using a trained regression model trained on a plurality of videos depicting movement of persons, wherein the trained regression model predicts relative joint angles of body parts and excludes prediction of body shape and root translation of the human body model in three dimensional space of the body model.

Some implementations may include a computer-implemented method that includes operations performed by a processor of a system described above. Some implementations may include a system that includes a processor and a memory coupled to the processor. The memory may have instructions stored thereon that, when executed by the processor, cause the processor to perform operations that include one or more of the features of the methods described above.

Some implementations include a non-transitory computer-readable medium with instructions stored thereon that, when executed by a processor, cause the processor to perform operations that can be similar to features of the methods and/or systems described above.

BRIEF DESCRIPTION OF THE DRAWINGS

FIG. 4 is a flow diagram of an example method to update a pose sequence in an iterative process to produce a refined pose sequence, in accordance with some implementations.

FIG. 9 is a block diagram illustrating an example computing device which may be used to implement one or more features described herein, in accordance with some implementations.

DETAILED DESCRIPTION

Figure 1:
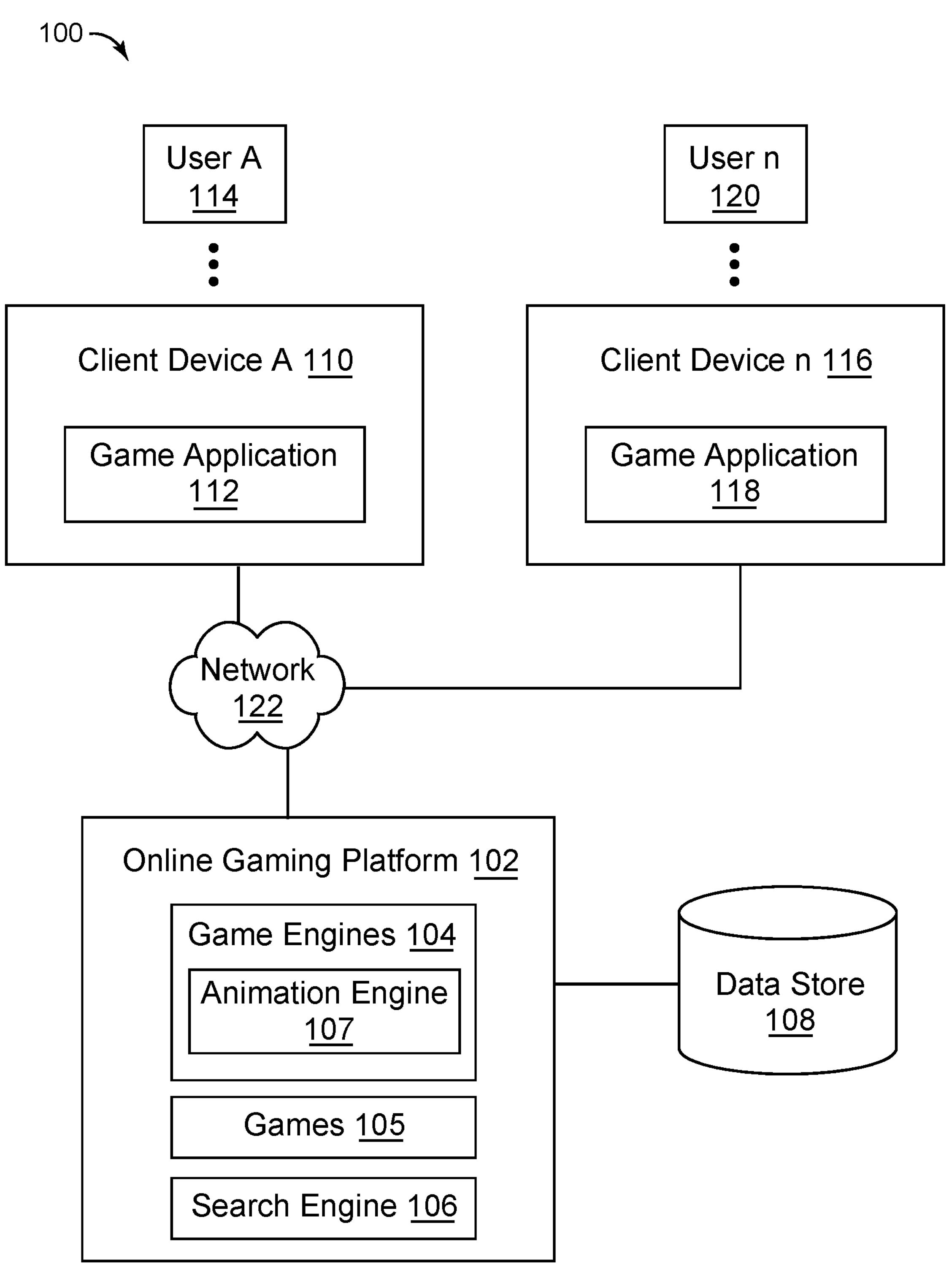
FIG. 1 is a diagram of an example system architecture, in accordance with some implementations.

One or more implementations described herein relate to determination of human poses in a video and providing animation of computer models based on the determined poses. In some implementations, features can include determining, using a machine learning model, an initial pose sequence of a human body model based on image data in frames of an input video. The frames depicts movement of a person, and the initial pose sequence includes a plurality of poses of the human body model that correspond to the frames of the input video. A pose sequence, such as the initial pose sequence (or other pose sequence), is updated via one or more iterative processes to produce a refined pose sequence that more accurately corresponds to the motion of the person shown in the video.

In some implementations, updating of a received pose sequence includes iteratively adjusting or optimizing parameters of the human body model and a camera view of the human body model, based on reprojection error and other errors in the poses of the sequence, to more accurately portray the person and movement of the input video. The adjustment can be influenced by multiple constraints to the human body model parameters (e.g., joint angles and global position) and to the camera view of the human body model (e.g., camera orientation and allowed degrees of freedom). The adjustment can be influenced by one or more cost functions that punish particular parameter values related to positions and/or joint angles of the human body model, e.g., for floor contact, upright position, joint rotation, and smoothness. A human pose prior can be used to constrain joint angles of the human body model to realistic angles that a human body can assume.

In some implementations, updating of a received pose sequence includes iteratively optimizing parameters of the human body model and/or camera view, as well as parameters related to the motion of the human body model over multiple poses of the pose sequence. For example, the updating can include use of a human motion model and motion prior to determine realistic motions of the human body model. In some examples, a chain of predicted poses are determined using the motion prior, for each pose in an original pose sequence. A consistency error is determined between corresponding predicted poses from each chain of poses, and this error is mitigated over multiple iterations of determining the chains of poses and consistency error, thus providing a smoothing of motion provided by the pose sequence.

For example, in some implementations pose sequence determination can be performed in three stages, where a fast initialization stage provides an initial pose sequence, followed by two stages of updates to the pose sequence. For example, a first refined pose sequence can be determined based on updates of human body model joint angle parameters and camera view parameters, and a second refined pose sequence can then be determined based on adjustments of those same parameters as well as motion parameters via use of the human motion prior.

Features described herein provide improved and more computationally efficient determination of a sequence of poses of a human body model that correspond to movement of a person depicted in a video. The poses of the human body model can be converted to apply to a computer model, e.g., a character model or avatar in a game or virtual experience that is part of a virtual environment or metaverse.

Described features provide an accurate pose sequence that more closely corresponds to the motion in the video than in other techniques. In many previous techniques, pose sequences often did not correspond accurately to the video. For example, previous techniques often provide poses that are in skewed or unnatural positions or orientations, e.g., tilted with respect to a flat ground plane, having unnatural joint rotations, or having feet too far above or below the ground plane. Described techniques, in contrast, can provide an accurate and realistic pose sequence using a fast initialization stage and one or more update/optimization stages to reduce such unnatural poses. Furthermore, the optimization stages can include constraints and/or cost functions to reduce such unnatural poses when adjusting parameters of the human body model.

Furthermore, previous techniques often provide pose sequences having unnatural motion, e.g., including temporal inconsistencies or discontinuities in the form of jitters and/or other subtle motion effects that do not appear natural. In some prior techniques, traditional filtering systems may be applied, such as a low-pass filter, to remove high frequency jitter, but the resulting motions are often damped and still may appear unnatural. In contrast, implementations of techniques described herein reduce such temporal inconsistencies in a pose sequence without providing damped motion, via use of a human motion prior, to provide natural motion of a character model or avatar.

Previous techniques may require significant processing resources to compute pose sequences. Described techniques, in contrast, can provide a fast initialization stage to determine an initial pose sequence that later update stages can process, thus saving time and processing in the later stages which would otherwise start from a random or arbitrary initial pose sequence that requires more iterations (and higher computation resources) to optimize. In addition, the initialization stage prepares initial poses that avoid incorrect local minima such as incorrect poses that are not easily distinguished from correct poses in the update stages, thus saving processing time and resources by eliminating the need for correction of such inaccuracies.

In addition, the update stages as described herein can apply various constraints and cost functions to the adjustment of pose sequence parameters such as joint angle parameters and camera view parameters. Such constraints and cost functions can reduce processing requirements by restricting and/or biasing the adjustment in particular directions to converge quickly on accurate and realistic resulting pose sequences.

Some prior techniques may provide predicted poses using a human motion prior, but do so sequentially for many iterations. Such processing requires significant amounts of time and processor and memory resources. Described techniques, in contrast, can provide parallel determination of predicted poses based on a human motion prior, within a small number of iterations, thus providing significant savings in processing time and/or resources.

Described features thus provide technical advantages that enable reduction of use of computational resources (e.g., computer memory, processor use and time, networking traffic bandwidth, etc.) to create accurate and realistic pose sequences from video frames that can be used to animate computer models (e.g., avatars).

FIG. 1 illustrates an example system architecture 100, in accordance with some implementations of the disclosure. System architecture 100 is provided for illustration. In some implementations, the system architecture 100 may include the same, fewer, more, or different elements configured in the same or different manner as that shown in FIG. 1. System architecture 100 (also referred to as "system" herein) includes an online gaming platform 102, a first client device 110 (generally referred to as "client devices 110/116" herein), a network 122, and a second client device 116. The online gaming platform 102 can include, among other things, a game engine 104, one or more games 105, a search engine 106, an animation engine 107, and a data store 108. The client device 110 can include a game application 112. The client system 116 can include a game application 118. Users 114 and 120 can use client devices 110 and 116, respectively, to interact with the online gaming platform 102.

The term "game," as used herein, refers to any virtual experience, including games with specified objectives or end states, as well as other types of virtual experiences such as concerts, meetings, virtual gatherings, etc. that may not have a specific objective or end state. The game or virtual experience may include one or more avatars or character models. An avatar may be controlled by a human user, or may be a computer-generated avatar. In various implementations, an avatar may be a humanoid, an animal form, a vehicle form, or in any other form. In some implementations, the avatar may include a mesh (a set of points arranged in 3D space to obtain an avatar with body parts such as head, torso, limbs, etc.). Further, in some implementations, a texture may be attached to a mesh. The texture may define avatar skin parameters such as color, reflectivity, shape, etc. In various implementations, avatar animation may be performed automatically by game engine 104 and/or by game applications (112, 118). A gaming platform, as described herein, may include any platform that provides one or more virtual experiences in a virtual environment or metaverse. A game application, as described herein, may include any application that enables a user to participate in a virtual experience or game, and engage in gameplay, including configuring an avatar, moving about in 3D space (of the virtual experience or game), performing actions, engaging with other avatars, interacting with other users via text/audio/video chat, etc.

Online gaming platform 102 (also referred to as "user-generated content platform" or "user-generated content system") can offer a variety of ways for users to interact with one another. For example, users of an online gaming platform may play games that are provided by the platform, e.g., games that include player-controlled characters (avatars), non-player characters (avatars), and other game objects and mechanisms. Some online gaming platforms can provide a variety of different environments (e.g., two dimensional or virtual three-dimensional environments) in which users can play online games. In some implementations, users of an online gaming platform may create games or other content or resources (e.g., avatars, graphics, items for game play within a virtual world, etc.) within the gaming platform. Users of an online gaming platform may work together towards a common goal in a game or in game creation, share various virtual gaming items, send electronic messages to one another, and so forth. An online gaming platform may also allow users of the platform to communicate with each other, e.g., using voice messages (e.g., via voice chat), text messaging, video messaging, or a combination of the above.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a Long Term Evolution (LTE) network), routers, hubs, switches, server computers, or a combination thereof.

In one implementation, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online gaming platform 102 can include a server having one or more computing devices (e.g., a cloud computing system, a rackmount server, a server computer, cluster of physical servers, virtual server, etc.). In some implementations, a server may be included in the online gaming platform 102, be an independent system, or be part of another system or platform.

In some implementations, the online gaming platform 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming platform 102 and to provide a user with access to online gaming platform 102. The online gaming platform 102 may also include a website (e.g., one or more webpages) or application back-end software that may be used to provide a user with access to content provided by online gaming platform 102. For example, users may access online gaming platform 102 using the game application 112/118 on client devices 110/116, respectively.

In some implementations, online gaming platform 102 may be a type of social network providing connections between users or a type of user-generated content system that allows users (e.g., end-users or consumers) to communicate with other users via the online gaming platform 102, where the communication may include voice chat, video chat, or text chat. In some implementations of the disclosure, a "user" may be represented as a single individual person. However, other implementations of the disclosure encompass a "user" (e.g., creating user) being an entity controlled by a set of users or an automated source. For example, a set of individual users federated as a community or group in a user-generated content system may be considered a "user." In some implementations, a "user" can include one or more programs or virtual entities, as well as persons that interface with the system or network.

In some implementations, online gaming platform 102 may be a virtual gaming platform. For example, the gaming platform may provide single-player or multiplayer games to a community of users that may access or interact with games (e.g., user generated games or other games) using client devices 110/116 via network 122. In some implementations, games (also referred to as "video game," "online game," or "virtual game" herein) may be two-dimensional (2D) games, three-dimensional (3D) games (e.g., 3D user-generated games), virtual reality (VR) games or environments, or augmented reality (AR) games, for example. In some implementations, games can include environments which may not have game goals, e.g., simulators of particular actions or environments which a player can explore and/or interact with. In some implementations, users may search for games and participate in gameplay with other users in one or more games selected from results of the search. In some implementations, a game selected from results of the search may be played in real-time with other users of the game.

In some implementations, other platforms can be used with the pose sequence determination and/or animation features described herein instead of or in addition to online gaming platform 102. For example, a social networking platform, purchasing platform, messaging platform, creation platform, etc. can be used to match users to other users and/or platform features, functions, and services.

In some implementations, gameplay may refer to interaction of one or more players using client devices (e.g., 110 and/or 116) within a game (e.g., 105) or the presentation of the interaction on a display or other output device of a client device 110 or 116.

One or more games 105 are provided by the online gaming platform. In some implementations, a game 105 can include an electronic file that can be executed or loaded using software, firmware or hardware configured to present the game content (e.g., digital media item) to an entity. In some implementations, a game application 112/118 of a game may be executed and one or more game instances can be rendered in connection with a game 105 and game engine 104. In some implementations, a game 105 may have a common set of rules and/or common goal, and the environments of a game share the common set of rules and/or common goal. In some implementations, different games 105 may have different rules or goals from one another.

In some implementations, games 105 may have one or more environments (also referred to as "gaming environments" or "virtual environments" herein) where multiple environments may be linked. An example of an environment may be a three-dimensional (3D) environment. The one or more environments of a game may be collectively referred to a "world" or "gaming world" or "virtual world" or "universe" herein. An example of a world may be a 3D world of a game. For example, a user may build a virtual environment that is linked to another virtual environment created by another user. An avatar in the virtual game may cross the virtual border of one virtual environment to enter an adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming platform 102 can host one or more games 105 and can permit users to interact with the games 105 (e.g., create, modify, search for, request, and/or join a game 105, game instances of game 105, game-related content, or other content) using a game application 112/118 of client devices 110/116. Users (e.g., 114 and/or 120) of the online gaming platform 102 may play, create, interact with, or build games 105, search for games 105, communicate with other users, create and build objects (e.g., also referred to as "item(s)" or "game objects" or "virtual game item(s)" herein) of games 105, and/or select or search for objects. For example, when generating user-generated virtual items, users may create avatars, attributes or actions for the created avatars, decoration for the avatars, one or more virtual environments for an interactive game, or build structures used in a game, among others. In some implementations, users may buy, sell, or trade game virtual game objects, such as in-platform currency (e.g., virtual currency), with other users of the online gaming platform 102. In some implementations, online gaming platform 102 may transmit game content to game applications (e.g., 112). In some implementations, game content (also referred to as "content" herein) may refer to any data or software instructions (e.g., game objects, game, user information, video, images, commands, media item, etc.) associated with online gaming platform 102 or game applications. In some implementations, game objects (e.g., also referred to as "item(s)" or "objects" or "virtual game item(s)" herein) may refer to objects that are used, created, shared or otherwise depicted in games 105 of the online gaming platform 102 or game applications 112 or 118 of the client devices 110/116. For example, game objects may include a part, model, avatar, tools, weapons, clothing, buildings, vehicles, currency, flora, fauna, components of the aforementioned (e.g., windows of a building), and so forth.

In some implementations, a user can create or modify a computer model that is a game object, such as an avatar (e.g., character model) used in one or more games. For example, the user can create or modify a skeleton, shape, surface texture and color, and/or other attributes of an avatar. In some examples, an avatar can be similar to a human body model, e.g., can have a head, torso/abdomen, arms, legs, hands, feet, joints, etc. and can move similarly to a human body (e.g., walk, run, jump, turn head, move arms, etc.). In some cases, the avatar can have fewer joints than a human body, and in other cases, the avatar can have all joints or more joints than a human body.

In some implementations, an avatar can be animated by a user, e.g., instructed to move within a computer generated environment. For example, instructions can be provided to move one or more parts of the avatar (e.g., parts corresponding to limbs or body parts of a human) to one or more different poses, each pose providing particular joint angles for joints of the avatar. The instructions to move the model can be provided from a user in an editor interface, e.g., the user commanding the movement via input in the interface. In some cases, the instructions can be provided from storage and can include a sequence of poses for the avatar, where each pose indicates joint angles for the joints of the avatar, and where the avatar is moved to each pose in the pose sequence. In some examples, each pose of the avatar can be captured as an animation frame of an animation that is stored as a sequence of poses of the avatar. If the animation is commanded to play (e.g., in response to the user providing particular input in an interface or during a game, or a game causing the animation to play due to an event in a game or other environment), the avatar is moved to each pose of the animation in the pose sequence, according to a specified play rate and any other play parameters.

It may be noted that the online gaming platform 102 is provided for purposes of illustration, rather than limitation.

In some implementations, a game 105 may be associated with a particular user or a particular group of users (e.g., a private game), or made widely available to users of the online gaming platform 102 (e.g., a public game). In some implementations, where online gaming platform 102 associates one or more games 105 with a specific user or group of users, online gaming platform 102 may associate the specific user(s) with a game 105 using user account information (e.g., a user account identifier such as username and password).

In some implementations, online gaming platform 102 or client devices 110/116 may include game engines 104 or game application 112/118. In some implementations, the game engines 104 can include a game application similar to game application 112/118. In some implementations, game engines 104 may be used for the development and/or execution of games 105. For example, game engines 104 may include a rendering engine ("renderer") for 2D, 3D, VR, or AR graphics, a physics engine, a collision detection engine (and collision response), sound engine, scripting functionality, artificial intelligence engine, networking functionality, streaming functionality, memory management functionality, threading functionality, scene graph functionality, or video support for cinematics, among other features.

Game engine 104 may also include an animation engine 107, including features that can convert person movement in videos to animations for computer models, as described herein. In some examples, a user of a client device 110/116 can upload a video via network 122 to the online gaming platform 102. A video-to-animation service of the online gaming platform 102 can provide the video to animation engine 107, which can include pose generation machine learning model(s) that performs pose sequence generation from the input video as described herein. In some implementations, these machine learning models can be implemented on a GPU of a device providing the online gaming platform. The generated pose sequence can be provided by the animation engine 107 to the service as an animation. The service can return the animation to the client device 110/116. In some implementations, the editor application can modify the pose sequence to correspond to a particular avatar that the user has selected, e.g., reduce the number of joints, adjust the lengths of links of the skeleton between joints, etc. If the user commands (e.g., in an editor interface displayed by the client device) the animation to be played on a selected avatar, the animation is displayed by the client device.

The components of the game engines 104 may generate commands that help compute and render a game instance of the game 105 (e.g., rendering commands, collision commands, physics commands, etc.). In some implementations, game applications 112/118 of client devices 110/116, respectively, may work independently, in collaboration with game engine 104 of online gaming platform 102, or a combination of both.

In some implementations, both the online gaming platform 102 and client devices 110/116 execute a game engine (104, 112, and 118, respectively). The online gaming platform 102 using game engine 104 may perform some or all the game engine functions (e.g., generate physics commands, rendering commands, etc.), or offload some or all the game engine functions to game applications 112 and 118 of client devices 110 and 116, respectively. In some implementations, each game 105 may have a different ratio between the game engine functions that are performed on the online gaming platform 102 and the game engine functions that are performed on the client devices 110 and 116. For example, a game engine 104 of the online gaming platform 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming platform 102 and client device 110 may be changed (e.g., dynamically) based on gameplay conditions. For example, if the number of users participating in gameplay of a game 105 exceeds a threshold number, the online gaming platform 102 may perform one or more game engine functions that were previously performed by the client devices 110 or 116.

For example, players may be playing in a game instance of game 105 on client devices 110 and 116, and may send control instructions (e.g., user inputs, such as directional inputs of right, left, up, down, avatar position and velocity information, text, voice input, etc.) to the online gaming platform 102. Subsequent to receiving control instructions from the client devices 110 and 116, the online gaming platform 102 may send gameplay instructions (e.g., position and velocity information of the avatars participating in the group gameplay or commands, such as rendering commands, collision commands, etc.) to the client devices 110 and 116 based on control instructions. For instance, the online gaming platform 102 may perform one or more logical operations (e.g., using game engine 104) on the control instructions to generate gameplay instruction for the client devices 110 and 116. In other instances, online gaming platform 102 may pass one or more or the control instructions from one client device 110 to other client devices (e.g., 116) participating in the game instance. The client devices 110 and 116 may use the gameplay instructions and render the gameplay for presentation on the displays of client devices 110 and 116.

In some implementations, the control instructions may refer to instructions that are indicative of in-game actions of a user's avatar. For example, control instructions may include user input to control the in-game action, such as right, left, up, down, user selection, gyroscope position and orientation data, force sensor data, text, voice input, etc. The control instructions may include avatar position and velocity information. In some implementations, the control instructions are sent directly to the online gaming platform 102. In other implementations, the control instructions may be sent from a client device 110 to another client device (e.g., 116), where the other client device generates gameplay instructions using the local game application 118. The control instructions may include instructions to play a voice communication message or other sounds from another user on an audio device (e.g., speakers, headphones, etc.).

In some implementations, gameplay instructions may refer to instructions that allow a client device 110 (or 116) to render gameplay of a game in a game instance, such as a multiplayer game. The gameplay instructions may include one or more of user input (e.g., control instructions), avatar position and velocity information, or commands (e.g., physics commands, rendering commands, collision commands, etc.).

In some implementations, the gameplay instructions can cause an animation associated with a game object, such as an avatar, to be played in the game. For example, control instructions can include a direct command to play an animation that causes the avatar to move (e.g., walk, jump, swing arms, dance, etc.). In some examples, control instructions that move an avatar may cause an animation of the avatar to commence based on interactions of the avatar with the game environment. For example, the avatar being moved off a ledge can cause a falling animation to be played for the avatar.

In some implementations, game objects (e.g., avatars, characters) are constructed from components, one or more of which may be selected by the user, that automatically join together to aid the user in editing. One or more avatars (also referred to as a "computer model," "character," or "character model" herein) may be associated with a player where the player may control the avatar when playing a game 105 to facilitate the player's interaction with the game 105. In some implementations, an avatar may include components such as body parts (e.g., hair, arms, legs, etc.) and accessories (e.g., t-shirt, glasses, decorative images, tools, etc.). In some implementations, body parts of avatars that are customizable by a player include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools. In some implementations, a player may control the scale (e.g., height, width, or depth) of an avatar or the scale of components of an avatar. In some implementations, the player may control the proportions of an avatar (e.g., blocky, anatomical, etc.). It may be noted that is some implementations, an avatar may not include an avatar game object (e.g., body parts, etc.) but the player may control the avatar (without the avatar game object) to facilitate the player's interaction with the game (e.g., a puzzle game where there is no rendered avatar game object, but a player user still controls an avatar to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creation and editing module and interface of game application 112/118 (or game engines 104) may publish a user's avatar for view or use by other users of the online gaming platform 102. In some implementations, creating, modifying, or customizing avatars, other game objects, games 105, or game environments may be performed by a user using a user interface (e.g., developer interface) and with or without scripting (or with or without an application programming interface (API)). For example, a developer interface can be displayed by a client device 110 and the user at the client device can select user interface commands to create and/or modify game objects (including avatars), environments, and scripts for a game. It may be noted that for purposes of illustration, rather than limitation, avatars are described as having a humanoid form. It may further be noted that avatars may have any form such as a vehicle, animal, inanimate object, or other creative form.

In some implementations, the online gaming platform 102 may store avatars (e.g., characters) created by users in the data store 108. In some implementations, the online gaming platform 102 maintains an avatar catalog and game catalog that may be presented to users via a user interface. In some implementations, the game catalog includes images of games stored on the online gaming platform 102. In addition, a user may select an avatar (e.g., an avatar created by the user or other user) from the avatar catalog to participate in the chosen game. The avatar catalog includes images of avatars stored on the online gaming platform 102. In some implementations, one or more of the avatars in the avatar catalog may have been created or customized by the user, and/or created or customized by other users. In some implementations, the chosen avatar may have avatar settings defining one or more of the components of the avatar. In some implementations, some avatars or portions of avatars (and/or data associated with the avatars) can be stored locally to client devices 110/116.

In some implementations, a user's avatar can include a configuration of components, where the configuration and appearance of components and more generally the appearance of the avatar may be defined by avatar settings. In some implementations, the avatar settings of a user's avatar may at least in part be chosen by the user. In other implementations, a user may choose an avatar with default avatar settings or avatar setting chosen by other users. For example, a user may choose a default avatar from an avatar catalog that has predefined avatar settings, and the user may further customize the default avatar by changing some of the avatar settings (e.g., adding a shirt with a customized logo). The avatar settings may be associated with a particular avatar by the online gaming platform 102.

Avatar settings can also include one or more animations associated with an avatar. An animation, when played, causes the avatar to move within the environment and/or move particular body parts or other physical features of the avatar. Each animation includes a sequence of multiple poses which the avatar assumes in a game environment (or other virtual environment) to cause the avatar to move or be otherwise changed in physical (displayed) appearance. For example, some animations can cause the avatar to have a particular facial expression (e.g., smile, frown, yell, laugh, etc.). Some animations can cause the one or more of the avatar's body components to move in a particular manner, e.g., to cause the avatar to walk, run, dive to the ground, jump, stagger, hop, roll on the ground, somersault, perform exercises, nod the head, shake the head from side to side, shrug shoulders, etc. An avatar can be associated with multiple animations, and each animation can be designated by a user (e.g., using the developer interface of game application 112/118 or game engines 104) to trigger and be played based on respective particular condition(s). For example, an animation can be designated by a user to be played on an avatar when the avatar is first displayed in a game environment or at other selected times after appearing within the game environment. Some animations can be designated to play for the avatar in response to a user command during the game, such as an action to move the avatar in the game environment, act on a different object in the game environment, a specific command to play the particular animation, etc.

According to features described herein, an animation (including a sequence of poses) can be created from a video that is input by the user to the online game platform, e.g., uploaded to the game platform from a client device. The animation engine 107, using one or more features described herein, can process the input video to determine a pose sequence that corresponds to movement of a person in the video, and provide an animation for an avatar based on the determined pose sequence. The animation engine 107 can provide the animation to the user as an option to be played for a specified avatar in games in which the user created or participates. For example, the created animation can be made available to the user as an option in an editing interface (or the user's account on the gaming platform). In some implementations, the user can select the animation to be applied to an avatar and can specify the animation to trigger in response to particular conditions in a game environment or other environment.

In some implementations, online gaming platform 102 may include a search engine 106. In some implementations, the search engine 106 may be a system, application, or module that permits the online gaming platform 102 to provide search functionality to users, where the search functionality permits the users to search games 105 that are available, the most popular games, game instances that are looking for players, game assets available on the gaming platform 102, etc.

In some implementations, the client device(s) 110 or 116 may each include computing devices such as personal computers (PCs), mobile devices (e.g., laptops, mobile phones, smart phones, tablet computers, or netbook computers), network-connected televisions, gaming consoles, etc. In some implementations, a client device 110 or 116 may also be referred to as a "user device." In some implementations, one or more client devices 110 or 116 may connect to the online gaming platform 102 at any given moment. It may be noted that the number of client devices 110 or 116 is provided as illustration, rather than limitation. In some implementations, any number of client devices 110 or 116 may be used.

In some implementations, each client device 110 or 116 may include an instance of the game application 112 or 118, respectively. In one implementation, the game application 112 or 118 may permit users to use and interact with online gaming platform 102, such as search for a game or other content, control a virtual avatar in a virtual game hosted by online gaming platform 102, or view or create or upload content, such as games 105, images, avatars, and other game objects, model animations, videos, web pages, documents, and so forth. In one example, the game application may be a web application (e.g., an application that operates in conjunction with a web browser) that can access, retrieve, present, or navigate content (e.g., virtual avatar in a virtual environment, etc.) served by a web server. In another example, the game application may be a native application (e.g., a mobile application, app, or a gaming program) that is installed and executes local to client device 110 or 116 and allows users to interact with online gaming platform 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application 112/118 may be an online gaming platform application for users to build, create, edit, upload content to the online gaming platform 102 as well as interact with online gaming platform 102 (e.g., play games 105 hosted by online gaming platform 102). As such, the game application 112/118 may be provided to the client device 110 or 116 by the online gaming platform 102. In another example, the game application 112/118 may be an application that is downloaded from a server.

In some implementations, a user may login to online gaming platform 102 via the game application. The user may access a user account by providing user account information (e.g., username and password) where the user account is associated with one or more avatars available to participate in one or more games 105 of online gaming platform 102.

In general, functions described in one implementation as being performed by the online gaming platform 102 can also be performed by the client device(s) 110 or 116, or a server, in other implementations if appropriate. In addition, the functionality attributed to a particular component can be performed by different or multiple components operating together. The online gaming platform 102 can also be accessed as a service provided to other systems or devices through appropriate application programming interfaces (APIs), and thus is not limited to use in websites.

Figure 2:
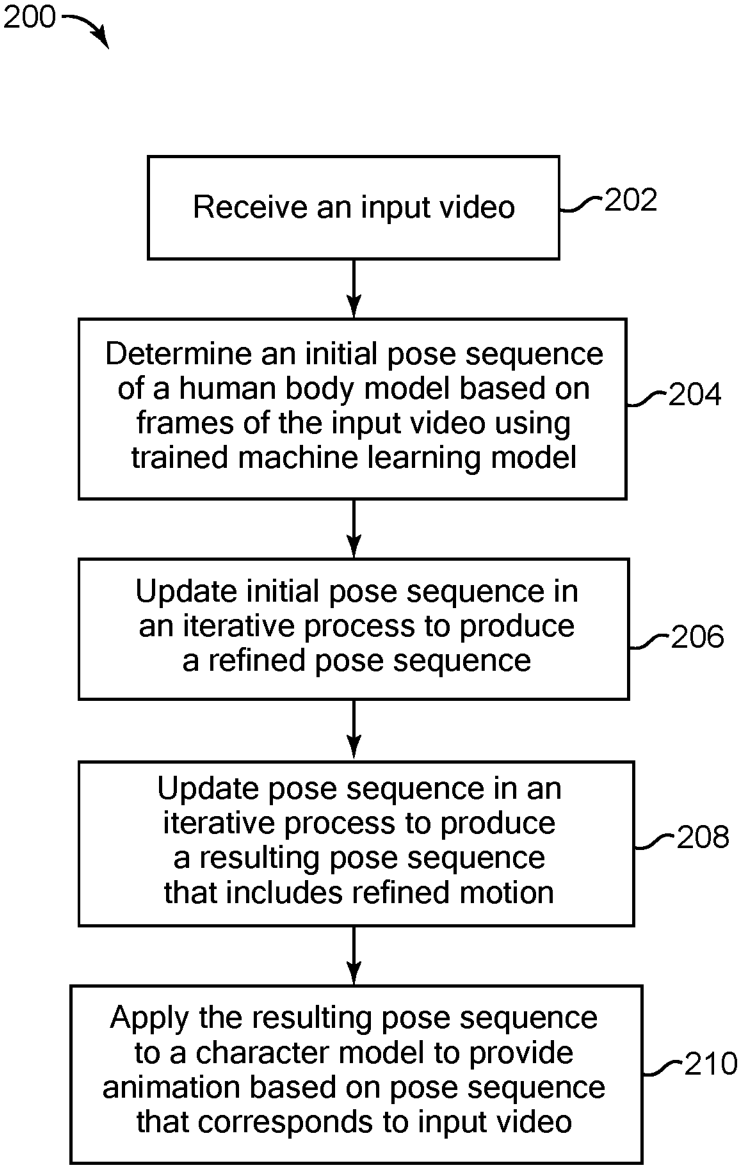
FIG. 2 is a block diagram of an example method to determine a pose sequence from an input video and provide an animation for a computer model, in accordance with some implementations.

FIG. 2 is a block diagram illustrating an example method 200 to determine a pose sequence from an input video and provide an animation for a computer model, in accordance with some implementations. In some implementations, method 200 can be implemented, for example, on a server system, e.g., online gaming platform 102 as shown in FIG. 1. In some implementations, method 200 can be performed by an animation engine 107 of an online gaming platform. In some implementations, some or all of the method 200 can be implemented on a system such as one or more client devices 110 and 116 as shown in FIG. 1, and/or on both a server system and one or more client systems. In described examples, the implementing system includes one or more processors or processing circuitry, and one or more storage devices such as a database, data structure, or other accessible storage. In some implementations, different components of one or more servers and/or clients can perform different blocks or other parts of the method 200. Method 200 may begin at block 202.

In block 202, an input video is received. For example, with reference to FIG. 1, the video file can be received at an online gaming platform 102 as an uploaded video file from a client device of a user (e.g., client device 110/116) or the video file can be otherwise received or obtained, e.g., from storage, via a link to an online storage location, etc. In some implementations, the input video can be in a standard video format. The input video includes multiple frames, each frame being an image having image data defined by pixels. In some implementations, the video frames depict a person moving, e.g., the person moving around in the area of the video frame and/or having one or more body parts that move (e.g., legs, arms, head, etc.). For example, some implementations can restrict the input video to showing a single person in the video frames, e.g., if a system implementing method 200 (or portions thereof) has been trained for such videos as in the example of FIG. 3, described below. In some implementations, the input video may have other conditions, e.g., have a duration equal to or less than a maximum duration so that processing time and resource expenditure are reduced by the system performing method 200.

In some example implementations, a user may use an editor interface that allows the user to create and modify a computer model (e.g., a character model). The user can generate and modify the computer model using edit tools provided in the interface. The user can also command the system to create an animation from a video for a specified computer model. In some implementations, the animation can be specified by the user as a generic animation provided from the video, where the animation is not yet associated with any computer model and can be applied to a computer model later specified by the user. The user can input a video file, which is loaded to a processor module (e.g., animation engine 107 of FIG. 1) to process the video into a pose sequence for the computer model. Block 202 may be followed by block 204.

In block 204, an initial pose sequence of a human body model is determined based on image data in frames of the input video, using a trained machine learning model. In some examples, the machine learning model can be a regression model. For example, a machine learning model can be trained using particular training videos, examples of which are described below with respect to FIG. 3.

In some implementations, the machine learning model is trained from videos in which there is one person depicted. For example, the machine learning model can include a convolutional neural network (CNN) that receives the frames of the input video. For each frame, based on its training, the model processes the entire frame and detects a human body and joints of the body, e.g., the points where an underlying skeleton of the body connect to each other and allow rotation of body parts. For example, such joints can include the top of the neck (for rotation of head), base of the neck (for rotation of the neck relative to torso), waist (for rotation of two torso portions), shoulder (for rotation of upper arm relative to torso), elbow (for rotation of forearm relative to upper arm), knuckles (for rotation of fingers relative to hand), joint at upper leg (for rotation relative to torso), knee (for rotation of lower leg relative to upper leg), ankle (for rotation of foot relative to lower leg), etc. For each pose of each video frame, the model determines an approximate joint angle of each body part at every joint detected in the frame. The set of joint angles describes a pose of the body in the frame.

In some examples, the machine learning model is a feedforward neural network that provides a single pass of processing of the video data through the layers of the neural network. This provides fast performance to determine an approximate estimation of the body's joint angles. Other types of machine learning models can be used in other implementations, e.g., a deep neural network, trained via supervised or unsupervised learning techniques, etc.

After the joint angles of a pose are determined by the machine learning model, the joint angles are converted to parameters of a human body model that is described by a set of parameters including joint angle parameters. For example, the Skinned Multi-Person Linear (SMPL) human body model can be used, which is a skinned vertex-based model that provides a three-dimensional (3D) mesh and uses parameters for joint angles of 23 joints of the human body, as well as parameters for shape and root translation (e.g., position of the body in a space such as the frame) of a human body. The joint angles determined by the machine learning model can be used to rotate the joints on the human body model. A set of specified joint angle parameters of the human body model is provided for each frame of the input video. The sets of joint angle parameters for the video frames can be the initial pose sequence corresponding to the input video.

The initialization of block 204 can be used to reduce the time required by later stages of method 200. For example, the initial poses determined in block 204 provide an approximate starting point that is closer to a final pose sequence than when starting from a random or default state.

The initialization of block 204 can also prepare the human body model in a state that reduces the occurrence of poor local minima. Such poor local minima can include incorrect and ambiguous poses that may not be corrected in later stages. For example, ambiguities may be present in determining the body pose due to having a single camera providing the two dimensional (2D) view in the video frames of a 3D object. In some implementations, the update/optimization stages of method 200 (as described below) may not be able to resolve or distinguish such ambiguities. For example, if block 204 only detects joint angles of the person in the video, it may be difficult to determine whether the person is facing to one side of the frame or the opposite side, since the joint angles of the body in either pose are in a similar configuration when viewed in two dimensions. Similarly, the person leaning forward or leaning backward may be difficult to distinguish. However, the machine learning model used in block 204 processes all of the pixels of each video frame and detects the context of the person, and thus can correctly determine the facing, lean direction, and other potentially-ambiguous poses of the person in the video.

In some implementations, to reduce processing time for determining the initial pose sequence, the machine learning model excludes determination or prediction of body shape and root translation of the body model in the 3D space of the body model. In other implementations, the machine learning model can predict shape parameters of the body. For example, the human body model may include shape parameters that may be specified, and such shape parameters can be used in later stages (e.g., in block 206 and/or block 208). For example, the body shape parameters can specify expansion or shrinkage of the human body along particular directions. The machine learning model can provide an estimate of shape parameters along with the joint angles describing body pose. In some implementations, no root translation parameters need be determined in block 204, which describe the position of the human body model in a 3D space. For example, the human body model can be locked to an origin position of that 3D space as a default, regardless of where the person moves relative to the borders of the video frames. Block 204 may be followed by block 206.

In block 206, the initial pose sequence determined in block 204 is updated using an iterative process to produce a refined pose sequence. For example, this iterative process can be an optimization that adjusts the parameters of the human body model in the pose sequence to provide a pose sequence that more accurately corresponds to the poses and motion of the person depicted in the input video. Block 206 can reduce errors that are included in the initial pose sequence, including a misalignment in the 3D space of the human body model compared to the 2D position of the person in the video frames. Examples of other errors that are reduced include the position of the human body model relative to a horizontal flat surface (e.g., a floor), a tilt of the human body model, body motion that is too fast, etc., as described below. Block 206 can include use of constraints and/or cost functions to reduce iterative processing required to obtain a targeted accuracy of the pose sequence.

In some implementations, the initial pose sequence from block 204 is encoded into parameters of a human pose prior that is trained from a large dataset of human poses and defines a prior of plausible and realistic pose parameters for the human body model. This pose prior penalizes impossible human poses and rewards valid human poses. It can provide a low-dimensional representation for human pose, e.g., a vector including multiple pose parameters that can be adjusted in block 206 (e.g., instead of joint angles).

In some example implementations, a joint optimization can be performed in block 206 that adjusts multiple parameters simultaneously. In some examples, other parameters that can be updated in block 206 include the root translation of the human body model. This update causes the position of the human body model in a 3D space to more closely correspond with a position of the person in the video frames. Furthermore, other positions can be updated, including the position of the human body model relative to a horizontal flat surface, e.g., a floor. Furthermore, camera view parameters can be updated to correlate the view of the 3D human body model to the 2D view of the person in the video frames.

Examples of updating the initial pose sequence in block 206 are described below with reference to FIGS. 4 and 5. In some implementations, block 206 can be performed without performing block 204, e.g., without receiving an initial pose sequence from block 204. For example, an initial pose sequence can be obtained from a different source, or an initialization of the poses of the human body model used in block 206 can be determined based on default values and/or based on a pose prior described with reference to FIG. 4.

Block 206 may be followed by block 208. In some implementations, block 206 may be followed by block 210, e.g., block 208 can be omitted and the pose sequence referenced in block 210 can be the updated pose sequence resulting from block 206.

In block 208, the pose sequence is updated using an iterative process that produces a resulting pose sequence that includes refined motion. In some implementations, the parameters of the human body model are updated similarly as in block 206, and additionally the motion provided by the pose sequence is updated (jointly with the human body model parameters) for realism and accuracy using a human motion prior. In some implementations, the human motion prior is used to predict a chain of poses from each pose of the input pose sequence, and corresponding predicted poses from each chain of poses are compared to determine a consistency error. Joint angles and/or a motion parameter can be updated based on this consistency error in multiple iterations, so as to minimize the error. Some examples are described below with reference to FIGS. 6-8.

The updates to motion produce a pose sequence that includes smoothed motion compared to the pose sequences generated in the prior blocks 204 and 206 of method 200. This smoothed pose sequence includes reduced jittery motion that may still be present in the pose sequence after earlier processing blocks (e.g., block 204 and/or 206). In addition, the smoothing of block 208 does not cause over-damped and unrealistic motion of the human body model, due to the human motion prior biasing toward realistic human motion in the pose sequence.

In some implementations, as shown in FIG. 2, block 208 can be performed after block 206, e.g., the pose sequence input to block 208 can be the refined pose sequence resulting from block 206. In some implementations, block 208 can be performed after block 204, e.g., the pose sequence input to block 208 can be the initial pose sequence resulting from block 204, and block 206 can be omitted. In some implementations, block 208 can be performed without performing block 204 or block 206. For example, an initial pose sequence can be obtained from a different source, or an initialization of the poses of the human body model used in block 208 can be determined based on default values and/or based on a pose prior described with reference to FIG. 4. Block 208 may be followed by block 210.

In block 210, the resulting pose sequence obtained from block 208 (or block 206) can be converted to an animation for a computer model. For example, the computer model can be an avatar or character model as described herein. The animation of the computer model corresponds to the movement of the person depicted in the input video. In some examples, if a user has associated the animation with a computer model as described in examples above (e.g., block 202), the pose sequence is applied to that computer model to provide the animation of the computer model, e.g., the positions of the joints and body parts of the human body model in the resulting pose sequence are adjusted to align with corresponding joints and body parts of the computer model.

In some implementations, the user can command an editor or other application program to play the animation using the computer model, which causes the computer model to be displayed on the display device to move its joints and/or its position in a computer environment to assume each of the poses in the sequence of the pose sequence. The animation can be played at a rate that is similar to the rate of playback of the input video (e.g., displayed in poses per second equal to the frames per second of the input video). In some implementations, the user can use the interface to edit the animation in various ways, e.g., adjust the rate of playback of portions of the animation or the entire animation, remove portions of the animation, add additional poses to the animation, etc. In some examples, the user can edit the animation after it has been associated with the selected computer model, or can edit the pose sequence that is not associated with any computer model.

The computer model (e.g., avatar) can be added to a game or other computer generated environment. Using the editor interface, the user can associate the animation, or portions thereof, with one or more particular conditions that will cause the animation to initiate and be played in the computer generated environment. For example, the user can associate the animation to trigger with the initialization of the computer model in the game (e.g., the starting of the game), a particular command received by a player of the game, a particular action performed by the computer model in the game (e.g., running, jumping, attacking, etc.), an event that affects the computer model in the game (e.g., being hit by an object, falling over an edge, etc.), or other conditions. When the game is played using the computer model, the animation is played in response to the condition being detected in the game.

Figure 3:
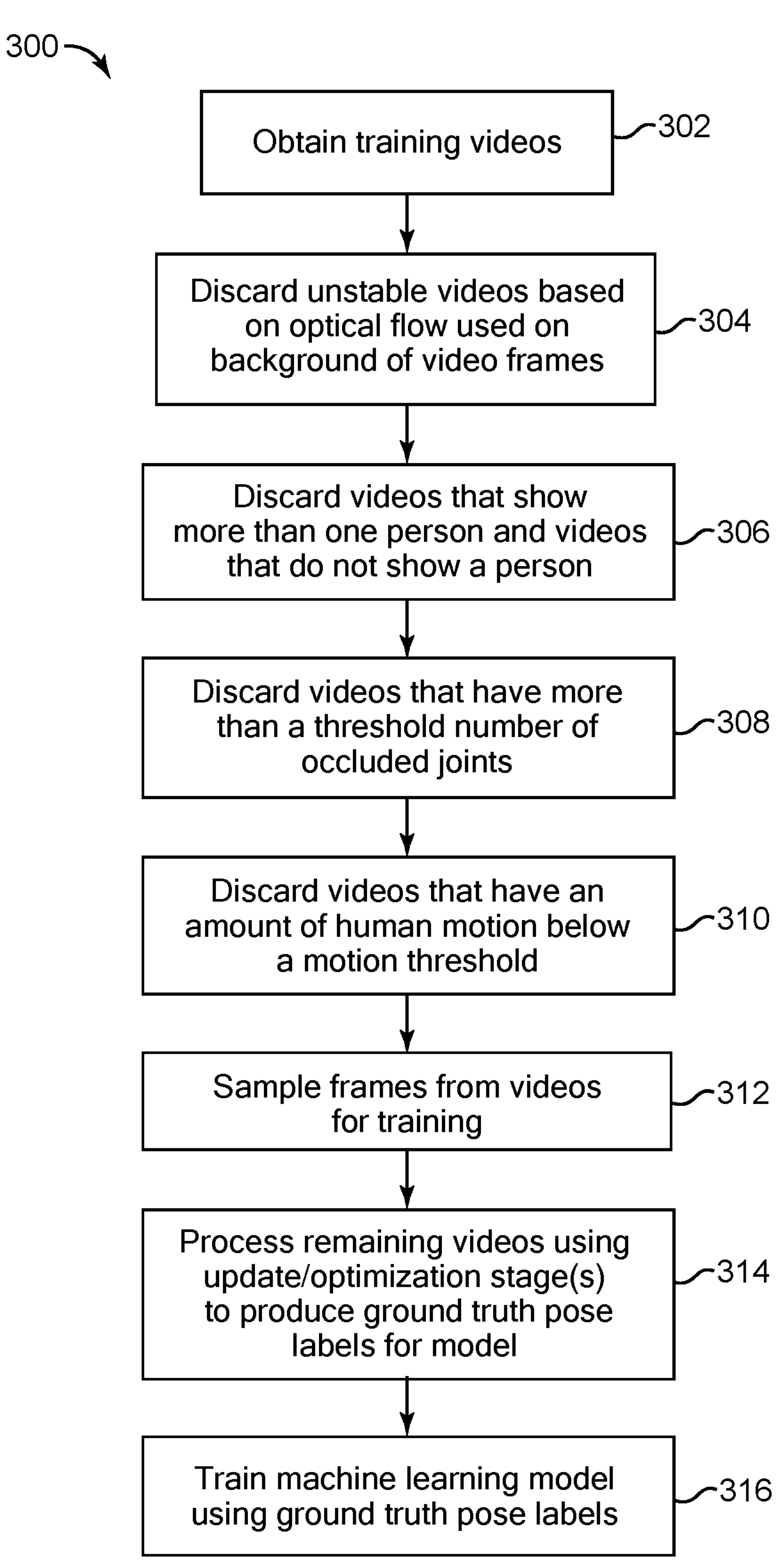
FIG. 3 is a flow diagram of an example method to train a machine learning model that can determine a pose sequence that corresponds to person movement in an input video, in accordance with some implementations.

FIG. 3 is a flow diagram illustrating an example method 300 to train a machine learning model that can determine a pose sequence that corresponds to person movement in an input video, in accordance with some implementations. Method 300 can be used, for example, to train a machine learning model that can be used to determine an initial pose sequence in block 204 of method 200 as described above. In some implementations, method 300 can be implemented, for example, on a server system, e.g., online gaming platform 102 as shown in FIG. 1. In some implementations, method 300 can be performed by an animation engine 107 or other engine of an online gaming platform. In some implementations, some or all of the method 300 can be implemented on a system such as one or more client devices 110 and 116 as shown in FIG. 1, and/or on both a server system and one or more client systems. In described examples, the implementing system includes one or more processors or processing circuitry, and one or more storage devices such as a database, data structure, or other accessible storage. In some implementations, different components of one or more servers and/or clients can perform different blocks or other parts of the method 300. Method 300 may begin at block 302.

In block 302, training videos are obtained. A high number of training videos can be obtained (e.g., hundreds, thousands, or more), to provide more effective training of the machine learning model. For example, publicly available videos with permission from users can be used. Additionally, or alternatively, videos may be generated or captured specifically for the purpose of training. Block 302 may be followed by block 304.

In blocks 304-308, videos are analyzed by the system and are removed from the training set of video if the video do not meet particular requirements.

In block 304, unstable videos are determined and are discarded from the set of training videos. The stability of videos is indicated by the amount of movement of the background of the video across the video frames. A background that moves large amounts indicates a camera that is moving and unstable, while a background that does not move or moves slight amounts indicates a stationary and/or stable camera. In some implementations, the stability of the videos can be determined by using an optical flow technique on the background of the video frames. The optical flow technique examines the amount of movement of background pixels from frame to frame. If this amount of movement is over a particular threshold, the video is considered unstable and is removed from the training set. Block 304 may be followed by block 306.

In block 306, persons in the video are detected and videos that show more than one person or do not show a person are discarded. For example, persons and/or faces depicted in the videos can be detected using image recognition techniques and/or machine learning models, e.g., a fast multi-person, 2D human landmark detector model. To provide more robust pose detection by the machine learning model to be trained, the training videos can show exactly one person, and videos that do not have this condition are removed from the training set. Block 306 may be followed by block 308.

In block 308, it is determined whether there are occluded joints in the videos, and videos that have more than a threshold number of occluded joints are discarded. Occluded joints may be blocked by other objects, parts of the person, etc. Occluded joints can be determined based on, for example, a 2D human landmark detector as described for block 306. For example, each detected joint may be associated with a confidence score from the landmark detector, and if the confidence score is below a threshold, the joint is considered not detected. If one or more joints are missing in the detection results, those joints can be considered occluded. Block 308 may be followed by block 310.

In block 310, human motion in the videos is detected, and videos that have an amount of human motion below a motion threshold are discarded. For example, human motion can be detected using any of various object motion detection techniques or machine learning models, e.g., in which an object (a person) is detected and is tracked over multiple video frames. A video that shows a person standing still or not moving any body part more than the threshold amount, can be considered to have low value for training, and such videos are removed from the training set. Block 310 may be followed by block 312.

In block 312, frames are sampled from the obtained videos to use for the training of the model. For example, every other frame, every third frame, etc. can be sampled. The smaller number of frames to process can reduce the required computation resources needed to train the model. Block 312 may be followed by block 314.

In block 314, the remaining videos in the training set are processed using one or more of the update/optimization stages of the described techniques, to produce ground truth pose labels for training the machine learning model. These update stages can be blocks 206 and 208 described for FIG. 2, for example. The update stages provide updates to parameters of a human body model to align the poses of the human body model with movement of a person in the video, and may use particular constraints and cost functions to create more accurate correspondence between a pose sequence and a video.

In some examples, a pose estimation can be determined for each training video using the process of FIG. 2 without an initialization step 204. For example, a set of joints and joint angles can be initialized and a 3D human body model defined for each training video, where the initial joints and joint angles can be obtained from a human pose prior model, such as pose prior examples described below with respect to FIG. 4. The poses of each training video can be updated and optimized using the update methods described in FIGS. 4 and 6. Similar constraints and cost functions can be used for the training videos as used in the update stages to determine the poses of the training video frames, and ground truth pose labels are created from these poses for the machine learning model training process. Block 314 may be followed by block 316.

In block 316, the machine learning model is trained using the ground truth pose labels of the training videos as determined in block 314. The trained machine learning model can be used to detect a person in an input video and determine the joints and joint angles of the person in each pose in each frame, which can be used to define an initial pose sequence of a human body model, as described above for block 204 of FIG. 2.

FIG. 4 is a flow diagram illustrating an example method 400 to update a pose sequence in an iterative process to produce a refined pose sequence, according to some implementations. In some implementations, method 400 can be used in block 206 of FIG. 2. The initial pose sequence can be the initial pose sequence determined in block 204 of FIG. 2, where the joint angles have been specified as parameters of a human body model. Method 400 may begin at block 402.

In block 402, 2D positions of joints of the person shown in the input video are determined using a machine learning model. For example, a convolutional neural network can be used to predict where the joints are located on a person depicted in an image, e.g., in each frame of the input video. In some examples, a pre-trained neural network can be used to detect 2D human pose landmarks, such as joints and body parts, in the video frames and provide 2D coordinates for the locations of the joints within each frame. Other machine learning models or other techniques of joint detection can also be used. Block 402 may be followed by block 404.

In block 404, the joint angles of the initial pose sequence (e.g., received from block 204 of FIG. 2) are encoded into the latent space of a human pose prior to obtain pose prior parameters. The human pose prior is a prior distribution of valid human poses that has been trained from a large dataset of human poses, thus biasing a model to have realistic human poses that can be assumed by real people (e.g., penalizing impossible human poses and allowing valid poses). In some example implementations, the VPoser variational human pose prior can be used, which defines a prior of SMPL pose parameters for the SMPL human body model.

The joint angles of the initial pose sequence, which can be provided as parameters of a human body model such as the SMPL model, can be encoded into pose prior parameters using a VPoser encoder model, to provide parameters of VPoser. VPoser parameters include a low-dimensional representation of human pose, including a 32-dimensional vector (32 VPoser parameters) in a Gaussian space that favors sensible human poses (e.g., at a peak of a Gaussian curve). The human pose prior biases parameters to provide 3D poses for the pose sequence that are more realistic poses. Block 404 may be followed by block 406.

In block 406, parameters for the human body model are determined initially for the poses of the pose sequence, including human body model parameters and camera view parameters. The human body model parameters include joint angle parameters specifying joint angles, where the joint angles are obtained by sampling and decoding the pose prior parameters. Realistic joint angles can be sampled and decoded from the pose prior parameters of the pose prior. For example, if Vposer is used as a pose prior, a loss function (e.g., a regularization term or regularizing loss) encourages the VPoser parameters to stay small, where small parameter values correspond to realistic poses and large parameters correspond to less realistic poses. Vposer parameters are decoded, using a Vposer decoder, into joint angles. The human body model parameters also include shape parameters and root translation parameters that are also obtained in block 406. The shape parameters specify the shape of the body as described above. The translation parameters specify the location of the human body model in a model space, e.g., based on a reference point on the human body model. Initially, these shape and root translation parameters may be set to default values (e.g., position a root joint at the origin of the world coordinate system and set all shape parameters to zero, which may correspond to a mean human shape).

The joint angles, shape parameters, and translation parameters are converted into parameters of a human body model. In some implementations, the SMPL body model can be used as the human body model. For example, matrix multiplications can be used to provide SMPL parameters from the input parameters. The human body model provides a 3D mesh that incorporates the parameters to provide angles for joints of the mesh. A 3D mesh is provided for each pose of the pose sequence.

Camera view parameters for the human body model are also determined. A virtual camera provides the camera view of the human body model and can be moved to change the view. The camera view parameters include intrinsic parameters and extrinsic parameters. Intrinsic parameters can be based on a (simulated) physical structure of a camera, e.g., the spacing and size of a sensor plate, camera lens, etc. These parameters are assumed to be fixed and are assigned standard values. Extrinsic parameters can include camera rotation and translation that indicate the camera orientation and position that provides the view of the human body model. For example, the camera can be moved in six degrees of freedom, including three rotational degrees of freedom and three translational degrees of freedom. Initially, the extrinsic camera parameters can be assigned default values, and initialization for one of these degrees of freedom can be computed. For example, the distance from the origin (where the human body model is initially placed) to the virtual camera can be determined based on the height of the person in the video frames (where the height is an average number of pixels from top to bottom of the detected person over all frames of the video). If the person is occupying very few pixels vertically, then the virtual camera can be initialized at a position far away from the origin, and if the person is occupying a larger number of pixels, the camera can be initialized at a position closer to the origin. In some examples, the camera can be aligned to a view along a particular axis with an initial distance along that axis determined by the height of the detected person. In some implementations, this initialization of camera view parameters can include initially pointing the camera view along a particular axis, e.g., a horizontal axis into the frame of the video.

In some implementations, one or more particular constraints can be imposed when determining or adjusting the above parameters to constrain the modeled system and reduce the processing required to optimize the parameters of the human body model. The constraints can be associated with a particular set of assumptions for input videos being processed by methods 200 and 400, e.g., being captured with a mobile device, oriented at a single subject, etc. The constraints can be applied when adjusting the parameters in block 418, described below. Block 406 may be followed by block 408.

In block 408, the poses of the human body model in the pose sequence are projected into a 2D image plane of corresponding input video frames. The projection of the human body model to the 2D plane can be performed by the system using any of a variety of projection techniques. For example, techniques of the SMPLify method can be used, which fits the SMPL human body model to 2D joints by minimizing an objective function that penalizes the error between the projected 3D model joints and detected 2D joints. Block 408 may be followed by block 410.

In block 410, a reprojection error is determined between the poses of the human body model and the images of the person in corresponding frames of the input video. For example, the joint positions of the projected human body model in each pose can be compared to the joint positions of the respective person image of the video frame that corresponds to that pose. The difference of positions between the body model and person image is determined as reprojection error. Block 410 may be followed by block 412.

In block 412, additional body model errors are determined for the human body model. These errors can involve a number of different attributes of the model that can be expressed as parameters.

In some implementations, the body model errors can include errors that involve the position or orientation of the human body model. For example, the errors can include an unbalanced orientation of the model, where the model is off-balance, e.g., leaning too far in one direction to be realistic and thus likely inaccurately portrays images of the input video. For example, a calculated center of gravity of the human body model may have a projected vertical component (at floor level) that is too far away (e.g., over a threshold distance) from the position of the feet of the model. Such off-balanced poses can realistically occur, e.g., as part of a jump, kick, fall, or other movement of a person, so error can be detected based on whether the off-balanced pose occurs for longer than a particular time threshold (e.g., a second or a few seconds).

The body model errors can include the position of the human body model relative to a floor plane. For example, if one or more feet penetrate through and below a flat floor plane in the model's environment, the model's root translation is in error. Another translation error can be detected if both feet are floating above the floor plane, e.g., above and not contacting the floor plane. Similarly as above, both fleet floating above the floor plane can realistically occur, e.g., as part of a jump, kick, fall, or other movement of a person, so the floating error can be detected based on whether the floating occurs for longer than a particular time threshold (e.g., a second or fraction of a second), as determined by examining multiple poses in the pose sequence.

In some implementations, the body model errors can include a smoothness error determined based on multiple sequential poses of the pose sequence. This can be detected as high joint velocities (e.g., over a velocity threshold), e.g., a body part moves or transitions more than a particular distance over a particular amount of poses (frames), indicating that the person's body part(s) are moving too fast to be realistic. Smoothness error can also include implausible translations of the entire body model in the 3D space, e.g., the body model moves more than a threshold velocity.

In some implementations, the body model errors can include implausible attributes of the body model. For example, the body shape of the human body model may have assumed an implausible shape (e.g., too thin, too tall, etc.). In some implementations, such a shape can be detected based on shape parameter thresholds, e.g., where the shape is outside a particular threshold range of shapes. In another example, the human body model may have implausible joint rotations, e.g., a body part moving or twisting in a particular impossible or implausible manner (e.g., some implausible joint rotations may not be corrected via the pose prior). Block 412 may be followed by block 414.

In block 414, it is determined whether the detected errors in the body model meet criteria that indicate that the optimization is complete. For example, if all the examined errors (reprojection error and any other examined errors) are at a satisfactory small amount (e.g., below particular thresholds), the criteria has been met. If the errors meet the criteria, the method continues to block 416, in which the iterations are stopped and method 400 is ended.

If one or more detector errors do not meet the criteria, the method continues to block 418, in which one or more parameters are adjusted based on the errors and based on applied cost functions.

In block 418, the pose parameters of the pose prior (which are decoded into joint angles), the shape parameters, root translation parameters, and extrinsic camera view parameters are adjusted in a manner that would reduce the reprojection error as determined in block 410 and/or reduce the other errors determined in block 412. In some implementations, the joint angles can be adjusted directly without using pose prior parameters.

For example, the parameters are adjusted to move the human body model joints closer to the joints in the corresponding video frames (align the joints). The parameters also cause the camera to rotate and/or translate, e.g., to cause the 3D mesh model to maintain an upright posture when feet are on the floor. In addition, all or some of the parameters can be regularized toward their default values, e.g., to avoid solutions that drift too far from the initial pose configurations. For example, the pose prior parameters can be regularized via the Gaussian distribution implemented by the pose prior.

For example, cost functions can be applied in adjusting the parameters to bias parameters toward values that provide less cost according to the cost functions. The cost functions encourage more accurate attributes of the poses of the human body model in the pose sequence by punishing the errors described above in blocks 410 and 412. In some examples, a reprojection cost function encourages joints of the posed human body model to move closer to the corresponding joint landmarks detected on the 2D video frame. A smoothness cost function punishes sequential frames in which the pose transitions too fast (e.g., over the velocity threshold). A floor contact cost function can (e.g., strongly) punish joints which move down through the floor plane and can also (e.g., weakly) punish configurations in which the feet joints move too far above the plane for longer than a threshold period of time (e.g., above a threshold distance above the floor plane). An off-balance (tilting) cost function can punish pose configurations in which the center-of-mass of the body is, for longer than a threshold period of time, not positioned vertically above the feet. Regularization cost functions can weakly regularize parameters such as shape and joint rotations back to default values of the human body model, so as to avoid extreme values for these parameters, e.g., parameters that would cause rotations of body joints that do not conform to a human skeleton. Regularization can be applied to extrinsic camera parameters, so that the camera stays close to its initialization. In some implementations, an assumption can be made that, during recording, the camera was pointed straight at the person (e.g., centered on the person) and is oriented upright (i.e., not tilted). In some implementations, the regularization can be made weak, so it can accommodate small deviations from these assumptions. In some examples, regularizing terms in a cost function can encourage the camera view to continue pointing along an initialization direction throughout the update and optimization (allowing some camera view drift).

In some implementations, one or more constraints can be imposed on the adjusting of parameters in block 418, which can reduce the complexity of the modeled system and reduce the processing required to optimize the parameters of the human body model. One or more of the constraints can be associated with a particular set of assumptions that apply to the input videos being processed by methods 200 and 400, e.g., videos are captured with a mobile device, oriented at a single subject, etc.

In some implementations, the constraints can include that the person in the video and the human body model are positioned on a flat, horizontal surface (floor plane), which reduces the possible directions of movement (root translation) of the human body model within the 3D space of the human body model and simplifies the definitions of other model-based cost functions (e.g., the cost function that encourages the person to be in an upright, non-tilted position). Furthermore, it allows the update method 400 to focus on the orientation of the person, rather than having to jointly optimize the person and floor simultaneously. This can speed up convergence and produce empirically accurate results.

The constraints can include that the input video was captured with a mostly stationary camera, which limits the range of movement of the camera view, e.g., limits the value range of the extrinsic camera view parameters for the human body model. For example, one set of extrinsic camera view parameters can be used which can be constrained for every frame. In addition, a cost function (as described above) can include a term to encourage the system performing method 400 to learn extrinsic camera view parameters close to the initialization values. In some implementations, the constraints can include that the camera is described by the pinhole model, e.g., an assumption that the virtual camera has no lens distortion, which makes the geometry of the video frames linear and simplifies some calculations.

The constraints can include that the person in the video is centered about the origin in world coordinates, e.g., as a term in a cost function as described above. The constraints can include that the movement of the camera view (described by extrinsic camera parameters) is in five of the camera's six degrees of freedom, and thus movement of the camera view is restricted in the sixth degree of freedom, to simplify adjustment of the extrinsic camera view parameters. For example, the sixth degree of freedom can be rotation of the view about a vertical axis of the camera, since rotation of the human body model can provide an equivalent change in view.

After block 418, the method can continue to block 408 to repeat blocks 408 to 414 with the adjusted (processed) pose sequence. For example, the adjusted poses are projected onto the 2D image planes of corresponding video frames to determine reprojection errors and other errors similarly as described above. Blocks 408 to 418 can be iteratively performed to update body model parameters at each iteration until the errors converge to a sufficiently small value to satisfy the criteria to stop the iterations. The resulting updated pose sequence more accurately depicts the person and movement in the input video.

Thus, the human body model is refined by iteratively and jointly optimizing parameters of the human body model and using constraints and cost functions. The joint optimization can be across time, e.g., including every time step of the input video to optimize all the poses of the pose sequence at one time.

Figure 5:
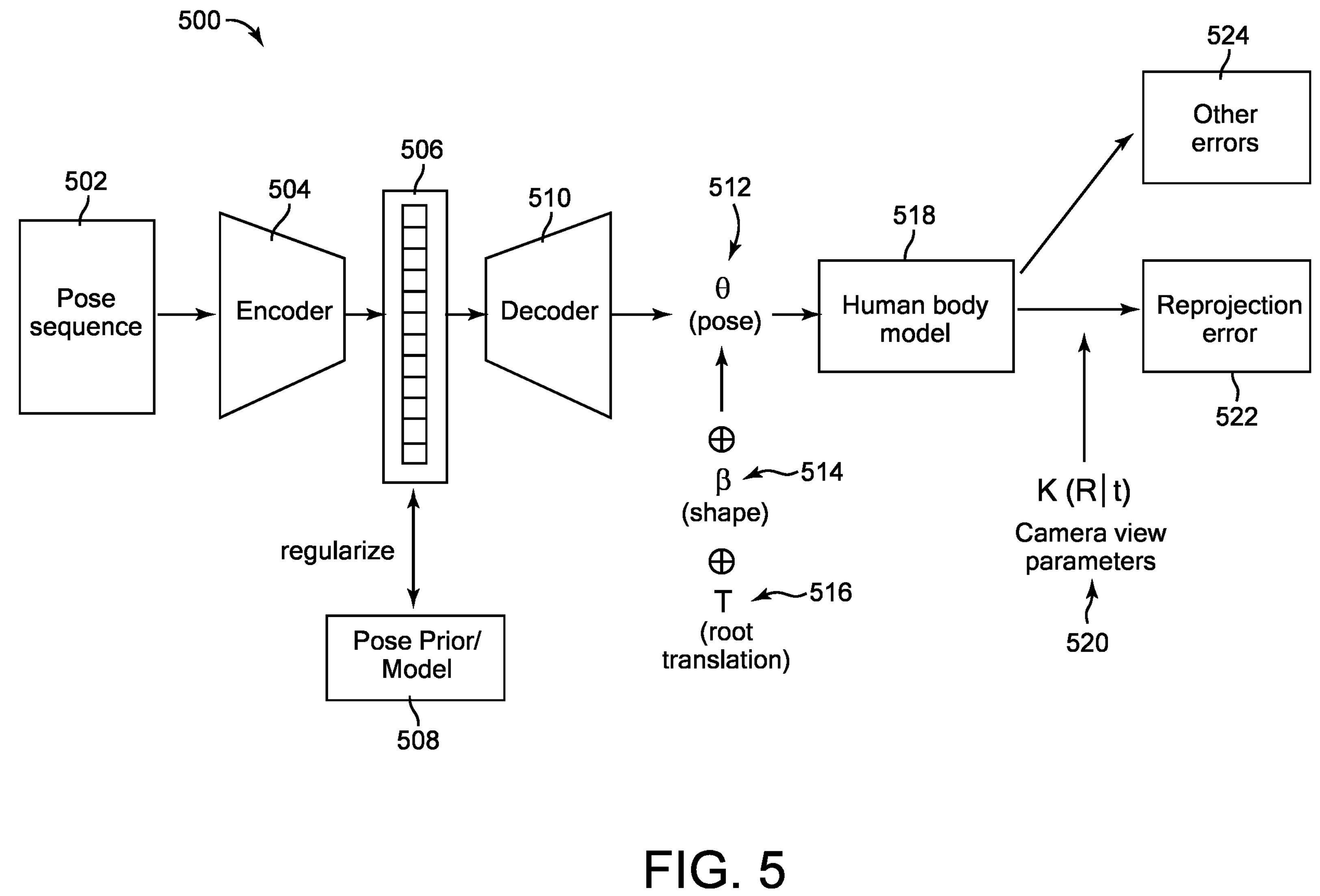
FIG. 5 is a block diagram of an example pipeline that implements the method of FIG. 4 to update a pose sequence, in accordance with some implementations.

FIG. 5 is a block diagram illustrating an example pipeline 500 that implements the method 400 of FIG. 4 to update a pose sequence to produce a refined pose sequence, according to some implementations.

In the example pipeline 500, pose sequence 502 can be the initial pose sequence provided by block 204 of FIG. 2. Pose sequence 502 is input to encoder 504, which encodes the joint angles of pose sequence 502 into the latent space of the human pose prior, to produce pose prior parameters 506. Pose prior parameters 506 are provided by pose prior/model 508, e.g., they are regularized via a Gaussian distribution implemented by the human pose prior. Pose prior parameters 506 are decoded by decoder 510 to produce pose parameters 512, which include the joint angles of the poses of the pose sequence. Shape parameters 514 and root translation parameters 516 are also provided that describe the shape and location of the poses in the pose sequence.

The pose parameters 512, shape parameters 514, and root translation parameters 516 are converted to human body model parameters of the human body model 518, which provides a 3D mesh for each pose of the pose sequence. The 3D meshes are projected onto the 2D images of the corresponding video frames based on camera view parameters 520, which include intrinsic camera parameters (K) and extrinsic camera parameters (rotation R and translation t). The joint positions of the projected body model are compared to the joints of the person image in the corresponding video frame and the reprojection error 522 between these joints is determined. In addition, other errors 524 can be determined, including floating distance of the body model above a floor plane, distance of the body model below the floor plane, off-balance tilt of the body model, high velocity of joints and body model, and implausible shape and joint rotation.

These errors, and cost functions that penalize the errors, are used to jointly adjust the parameters of the system to reduce the errors. In later iterations, the process causes errors to reduce and converge to provide an updated pose sequence that more accurately depicts the body movement in the input video.

Figure 6:
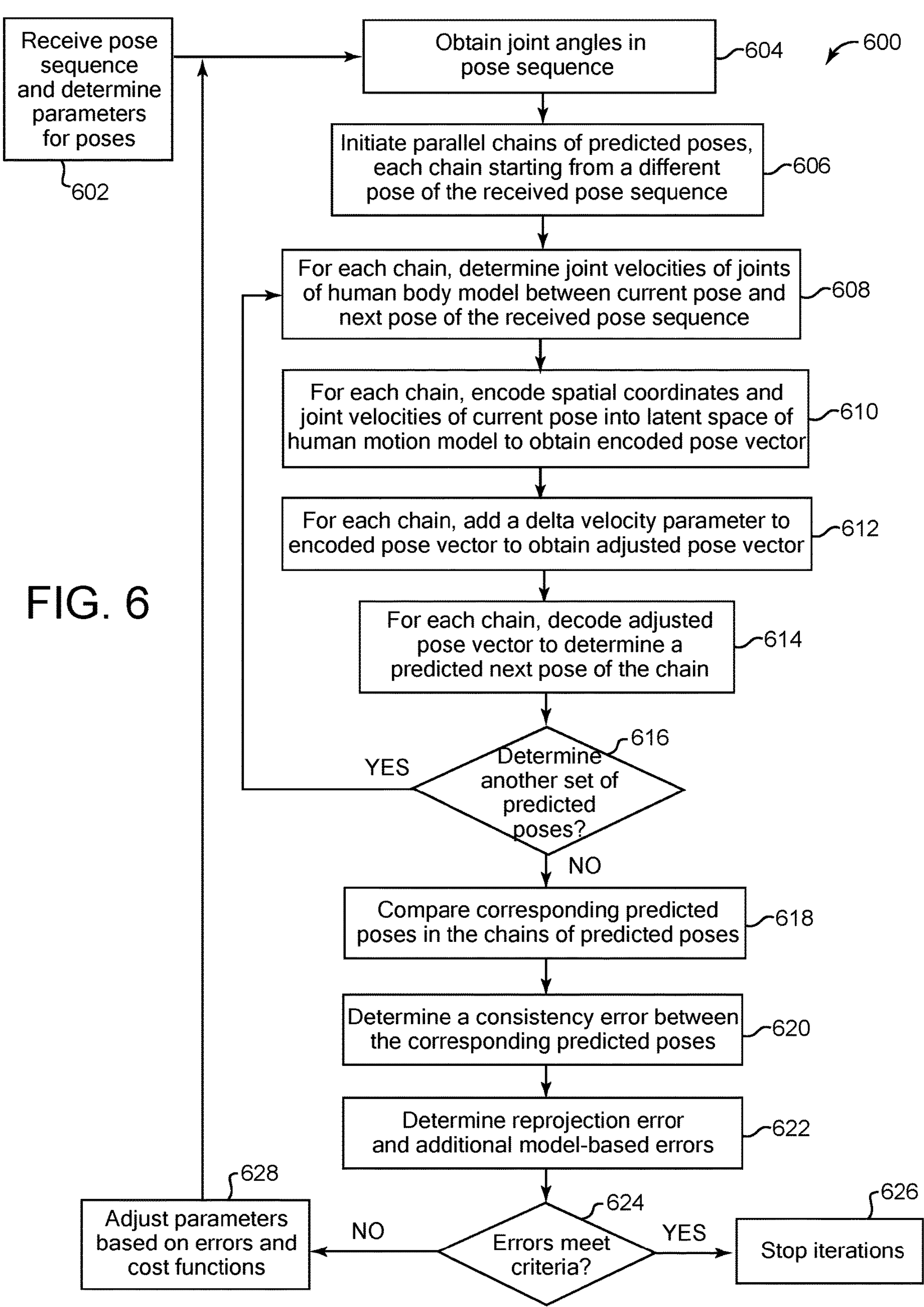
FIG. 6 is a flow diagram of an example method to update parameters of a pose sequence in an iterative process to produce a refined pose sequence including smoothed motion, in accordance with some implementations.

FIG. 6 is a flow diagram illustrating an example method 600 to update a pose sequence to produce a refined pose sequence including smoothed motion, according to some implementations. In some implementations, method 600 can be used in block 208 of FIG. 2. For example, method 600 can be performed after a previous iterative updating process that is described with reference to block 206 of FIG. 2, e.g., method 400 of FIG. 4. Method 600 provides additional refinement of the pose sequence that includes update of the parameters of the human body model to provide more accurate correspondence to the human body poses and motion in the input video as well as more realistic motion. For example, method 600 can smooth the motion of the poses in the pose sequence, e.g., remove or reduce temporal inconsistencies in the motion of the pose sequence. Method 600 may begin at block 602.

In block 602, a pose sequence is received and parameters are determined for the poses of the pose sequence. In some implementations, method 600 can be performed after the updating of block 206 of method 200, and the received pose sequence can be the refined pose sequence produced by block 206. In some implementations, method 600 can be performed after block 204 of method 200, and the received pose sequence can be the initial pose sequence determined in block 204.

The parameters for the human body model determined in block 602 can be similar to the parameters determined in blocks 402 to 406 of FIG. 4. For example, the 2D joint positions of the person shown in the video frames can be determined, the joint angle of the received pose sequence can be encoded into the latent space of a human pose prior, and parameters for the human body model can be determined, including body model parameters and camera view parameters. Block 602 may be followed by block 604.

In block 604, the joint angles in the received pose sequence are obtained. For example, these joint angles can be determined in block 602. In some implementations, the joint angles can be determined from pose prior parameters of a human pose prior, as described with reference to FIG. 4. In some implementations, the joint angles can be obtained directly from the poses of the received pose sequence. Block 604 may be followed by block 606.

In block 606, parallel chains of predicted poses are initiated. Each chain is initialized with a different pose of the received pose sequence as a current pose. For example, a respective chain is to be processed in parallel from each original pose of the received pose sequence, providing a different set of predicted poses. A predicted pose can be determined in each chain at least partially in parallel to the predicted poses of the other chains. In some examples, the parallel processing of the chains can be implemented in different processor threads of a processor of the system performing method 600. Block 606 may be followed by block 608.

In block 608, for each chain of predicted poses, joint velocities are determined for the joints of the human body model between the current pose and a next pose of the received pose sequence. The joint velocities can be determined based on determining a distance that a body part moves between consecutive (current and next) poses of the pose sequence, where a standard time period elapses between the consecutive poses of the pose sequence. In addition, spatial coordinates of the joints of the human body model can be determined, e.g., using a skinning procedure on the pose. For example, a skinning procedure defined by the SMPL body model can use linear blend skinning and can convert SMPL model parameters (including root location, relative joint angles, and body shape) to x,y,z joint coordinates. Block 608 may be followed by block 610.

In block 610, for each chain of predicted poses, the spatial coordinates of joints and joint velocities of the joints of the current pose are encoded into parameters of the latent space of a human motion model (e.g., human motion prior of the motion model) to obtain an encoded pose vector for the current pose. The pose vector embeds multiple parameters describing the joint velocities. The human motion model is a learned motion model that has been trained on an extensive motion capture dataset, and can robustly estimate plausible and realistic motions of a human body. The motion model includes a human motion prior that can regularize an optimization toward plausible motions. In some example implementations, the Human Motion Model for Robust Estimation (HuMoR) can be used as the human motion model, which provides a Gaussian probability distribution of possible pose transitions. Thus, joint velocities that are close to the peak of the distribution may be passed through the model map to pose transitions. The motion model produces the encoded pose vector that includes motion prior parameters, e.g., a multi-dimensional vector. Block 610 may be followed by block 612.

In block 612, for each chain of predicted poses, a delta velocity parameter in the latent space of the motion model is added to the encoded pose vector to obtain an adjusted pose vector. The delta velocity parameter is provided as a learnable parameter that allows adjustments to joint velocities in the optimization of the motion in the iterative process. In some examples, the delta parameter can be regularized, e.g., initialized as a small value close to zero, which regularizes the delta parameter toward the default motion prior space. Block 612 may be followed by block 614.

In block 614, for each chain of predicted poses, the adjusted pose vector is decoded into joint velocities using the motion model to provide a predicted next pose of the chain. For example, the motion model can provide an autoregressive rollout function which is used to provide joint velocities of all the joints of the pose, and the predicted next pose is determined based on the joint velocities, e.g., based on the distance that the joints move.

The output of the human motion model (e.g., the adjusted pose vector) can be used to adjust the joint angles that were provided by the pose prior as obtained in block 604 above, e.g., via back-propagation. The adjusted joint angles in the pose parameters are used to determine the human body model parameters. Thus, the output of the motion model affects the joint angles of the human body model used to determine the accuracy of the poses and motion of the pose sequence. Block 614 may be followed by block 616.

In block 616, it is determined whether another set (or level) of predicted poses is to be determined for the chains of predicted poses. In some implementations, a particular number of iterations of blocks 608 to 614 are performed to provide the particular number of predicted poses in each chain. For example, the particular number can be five, or can be a greater number. The greater the number of iterations, the more accurately the determined motion of the pose sequence corresponds to the input video, but this also increases the required computational resources and processing time.

If another set of predicted poses is to be determined (e.g., the particular number of iterations have not yet been performed), the method continues to block 608 where the predicted pose in each chain becomes the current pose and a set of next predicted poses is determined similarly as described above.

If no more sets of predicted poses are to be determined (e.g., the particular number of iterations have been performed), the method continues to block 618. Block 618 can be performed after the human body model parameters are determined.

Figure 7:
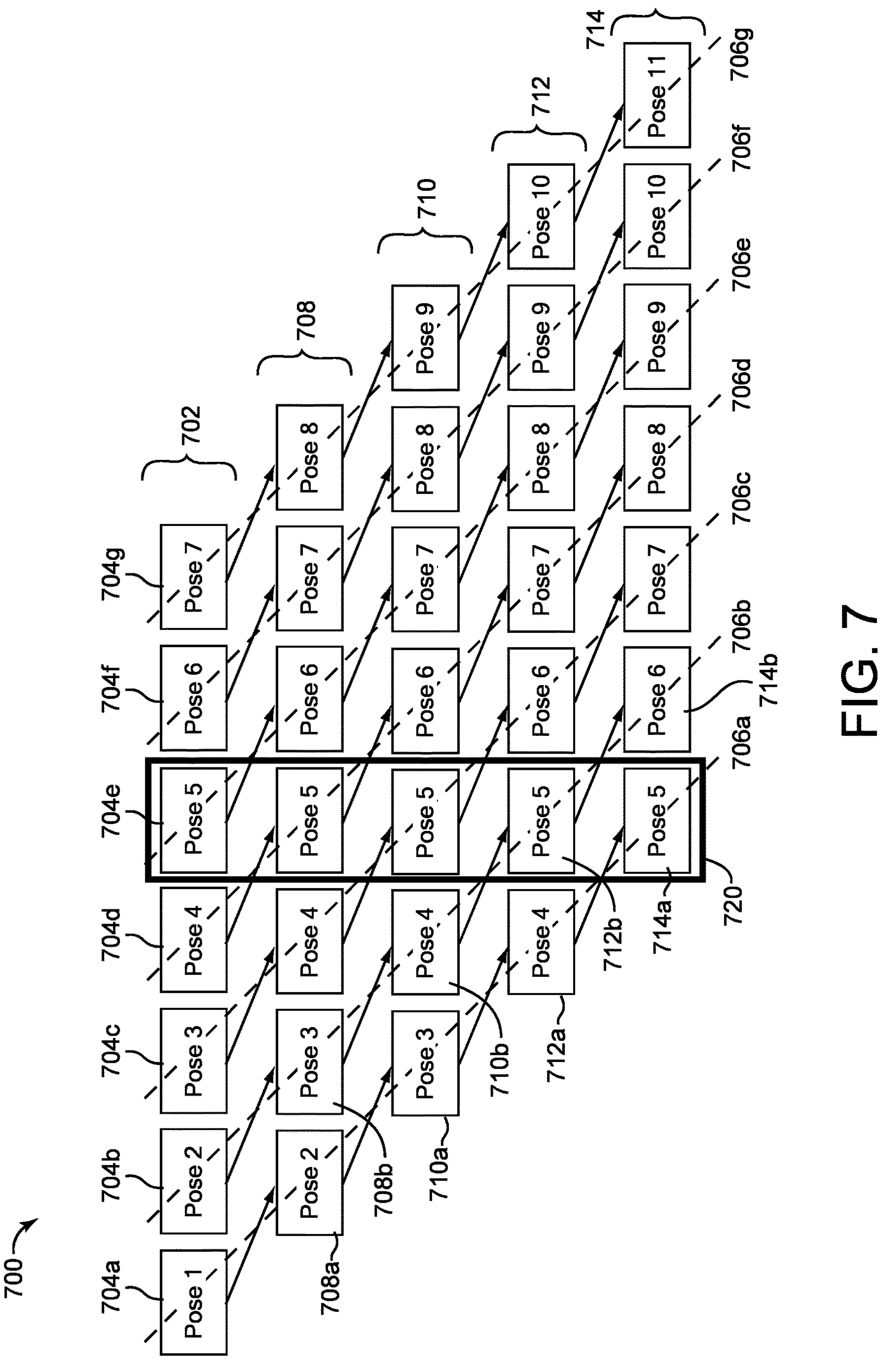
FIG. 7 is a diagrammatic illustration of an example of chains of predicted poses determined from a pose sequence, in accordance with some implementations.

In block 618, corresponding predicted poses in the chains of predicted poses are compared. Corresponding predicted poses are the predicted poses from the chains that correspond to the same video frame and represent the same pose in the original pose sequence (for example, they occur at the same time of the original pose sequence). For example, if the first chain starts from the original first pose, the second chain starts from the original second pose, and the third chain starts from the original third pose, the corresponding poses include the third pose in the first chain, the second pose in the second chain, and the first (original) pose in the third chain, all which represent the third pose and correspond to the third video frame. FIG. 7 shows an example of corresponding poses from chains of predicted poses.

In some implementations, a set of corresponding poses are compared with each other for each of the original poses (e.g., for each of the video frames). In some implementations, only a subset of the sets of corresponding poses are compared. Block 618 may be followed by block 620.

In block 620, a consistency error is determined for sets of corresponding predicted poses that include poses compared to each other in block 618. The consistency error indicates the deviation of the corresponding poses (in a set) from each other. Deviation in poses indicates error, and an ideal consistency error is zero that indicates that all the corresponding predicted poses in a set precisely match. In some examples, the consistency error for a set of corresponding poses can be based on a standard deviation of the corresponding poses, or based on another deviation measure. In some examples, an average can be determined of the corresponding predicted poses and the distance from that average is determined for each corresponding pose. The standard deviation is determined based on the distances from the average.

In some implementations, a consistency error is determined for each of multiple sets of corresponding predicted poses, and these consistency errors are combined (e.g., averaged or otherwise processed) to determine an overall or total consistency error that is used as the consistency error in later blocks of method 600. In various implementations, a consistency error is computed for each of multiple frames of the video that are a subset of the total frames in the video, or is computed for every frame of the video, and the multiple consistency errors are averaged to determine the total consistency error. Block 620 may be followed by block 622.

In block 622, a reprojection error and additional errors are determined for the human body model, similarly as described for blocks 408, 410, and 412 of FIG. 4. Block 622 may be followed by block 624.

In block 624, it is determined whether the errors of blocks 620 and 622 meet criteria that indicate that the optimization is complete. For example, if all the examined errors, including the consistency error between corresponding poses, reprojection error, and any other examined errors, are at a satisfactory small amount (e.g., below particular thresholds), the criteria has been met. If the errors meet the criteria, the method continues to block 626, in which the iterations are stopped and method 600 is ended.

If one or more detector errors do not meet the criteria, the method continues to block 628, in which parameters are adjusted based on the errors and based on applied cost functions. Block 628 adjusts the delta parameter added to the encoded pose vector in block 612 and adjusts other parameters as described for block 418 of FIG. 4 (e.g., pose parameters (e.g., joint angles) of the pose prior, shape parameters, root translation parameters, and extrinsic camera parameters). The parameters are adjusted in a manner that would reduce the errors determined in blocks 620 and 622. In some implementations, the adjustment is a joint optimization of all the parameters at one time.

For example, the delta parameter is adjusted to reduce the consistency error between corresponding predicted poses of the chains of poses. By adjusting the delta parameter, the joint angles of the pose parameters of the pose sequence are adjusted. The consistency error is desired to eventually converge to zero or close to zero over multiple iterations, such that the corresponding poses have little or no deviation from each other. This provides smoother, realistic motion as predicted by the motion model. The other parameters are adjusted to move the body joints of the pose sequence closer to the person joints detected in the corresponding video frames, including causing the camera view of the human body model to rotate and/or translate, and/or can include being adjusted to reduce the consistency error.

In addition, all or some of the parameters can be regularized toward their default values, e.g., to avoid solutions that drift too far from the initial pose configurations. Cost functions can be applied in adjusting the parameters to bias parameters toward values that provide less cost according to the cost functions, similarly as described for block 418 of FIG. 4. In some examples, there is a cost function term specifically on the delta vector parameters, which encourages those parameters to be small (i.e., pushes them toward a zero vector). The delta vector parameters are also influenced by many other cost function terms, such as the reprojection error and the additional model-based error terms. Learnable parameters in the human body model can be influenced by these sets of costs in one or more cost functions. Regularization costs can be directed at specific parameters.

After block 628, the method continues to block 604 to obtain joint angles for the poses in a pose sequence, similarly described above, with the pose sequence being the processed pose sequence having adjusted parameters. The parameters for the poses have been adjusted by block 628 and the joint angles have been modified. Blocks 604 to 616 can be iteratively performed until the consistency errors, reprojection errors, and other errors converge to a sufficiently small value to satisfy the criteria to stop the iterations.

For example, the encoder of the motion model receives the physical parameters of the joints (velocities, etc.) and returns a low dimensional latent vector (e.g., in block 610), to which a small delta vector is added (e.g., in block 612). The delta vector has learnable parameters and is adjusted during optimization (e.g., in block 628). Then the decoder of the motion model receives this slightly translated latent vector and outputs information to compute the physical parameters for the next time step. The delta vector is regularized, so it remains small and does not overpower the reprojection error, and these small adjustments to the latent vectors produce more natural motion as the optimization progresses.

Thus, the pose sequence can be refined by iteratively and jointly optimizing parameters. The joint optimization can be across time, e.g., including every time step of the input video to optimize all the poses of the pose sequence at one time. The resulting updated pose sequence more accurately depicts the body movement in the input video, including smoother and more realistic motion. Furthermore, method 600 reduces the computational resources (processing time, processing resources, memory or other storage, etc.) expended to determine predicted poses, e.g., by providing parallel processing of predicted poses for a small number of iterations determined to provide effective reduction of errors.

FIG. 7 is a diagrammatic illustration of an example of chains of predicted poses 700 determined from a pose sequence, in accordance with some implementations. In some implementations, chains 700 can be determined as described in blocks 606 to 616 of FIG. 6. Herein, reference numerals that have letter designations (e.g., "704*a*") may be used to refer to a specific element, and the same reference numeral without letter designations ("704") may be used to refer generically to multiple of those elements or the type of the element.

In this example, an original pose sequence 702 includes the original poses 704. The original pose sequence 702 includes seven poses 704*a* to 704*g*. Each original pose 704 is the initial pose in a respective chain of poses 706. For example, chain 706*a* starts with pose 704*a* (Pose 1), which is the first pose of the original pose sequence 702. Chain 706*a* includes predicted poses 708*a* (Pose 2), 710*a* (Pose 3), 712*a* (Pose 4), and 714*a* (Pose 5) that have each been predicted from the previous pose in the chain, as described in method 600 of FIG. 6. Similarly, chain 706*b* starts with pose 704*b* (Pose 2) and includes predicted poses 708*b* (Pose 3), 710*b* (Pose 4), 712*b* (Pose 5), and 714*b* (Pose 6), and so on for each of the other original poses 704*c* to 704*g* of pose sequence 702. Corresponding poses from each chain 706 are shown in FIG. 7 to be arranged vertically. The corresponding poses represent the same pose of the pose sequence, and each corresponding pose has been derived from a different original pose 704 of the original pose sequence 702.

Each set of predicted poses at each horizontal level shown in FIG. 7 (e.g., predicted poses 708, predicted poses 710, etc.) can be determined in parallel by a processing system, e.g., at least partially simultaneously, to greatly reduce processing time.

A number of iterations (e.g., levels) of pose predictions are performed for each chain 706, which in this example is four iterations to produce five sets or levels of predicted poses (708 through 714). After the iterations, corresponding poses from each chain are compared so that a consistency error can be determined among the corresponding poses. In this example, a set of corresponding poses is indicated by box 720. These corresponding poses are all "Pose 5" from each chain of predicted poses 706. Each Pose 5 is typically slightly different than the other Pose 5's due to these poses being predicted from slightly different previous poses. Similarly, the other sets of corresponding poses from chains 706 (e.g., each set in a vertical line) can be compared and a consistency error determined for each set. For example, Pose 4 of each chain 706, Pose 6 of each chain 706, etc. can be compared. Consistency errors from multiple sets can then be combined, e.g., averaged, to obtain a total consistency error that is used to adjust parameters of the pose sequence to provide more realistic poses in the pose sequence that are more closely aligned to the poses and movement in the input video.

Figure 8:
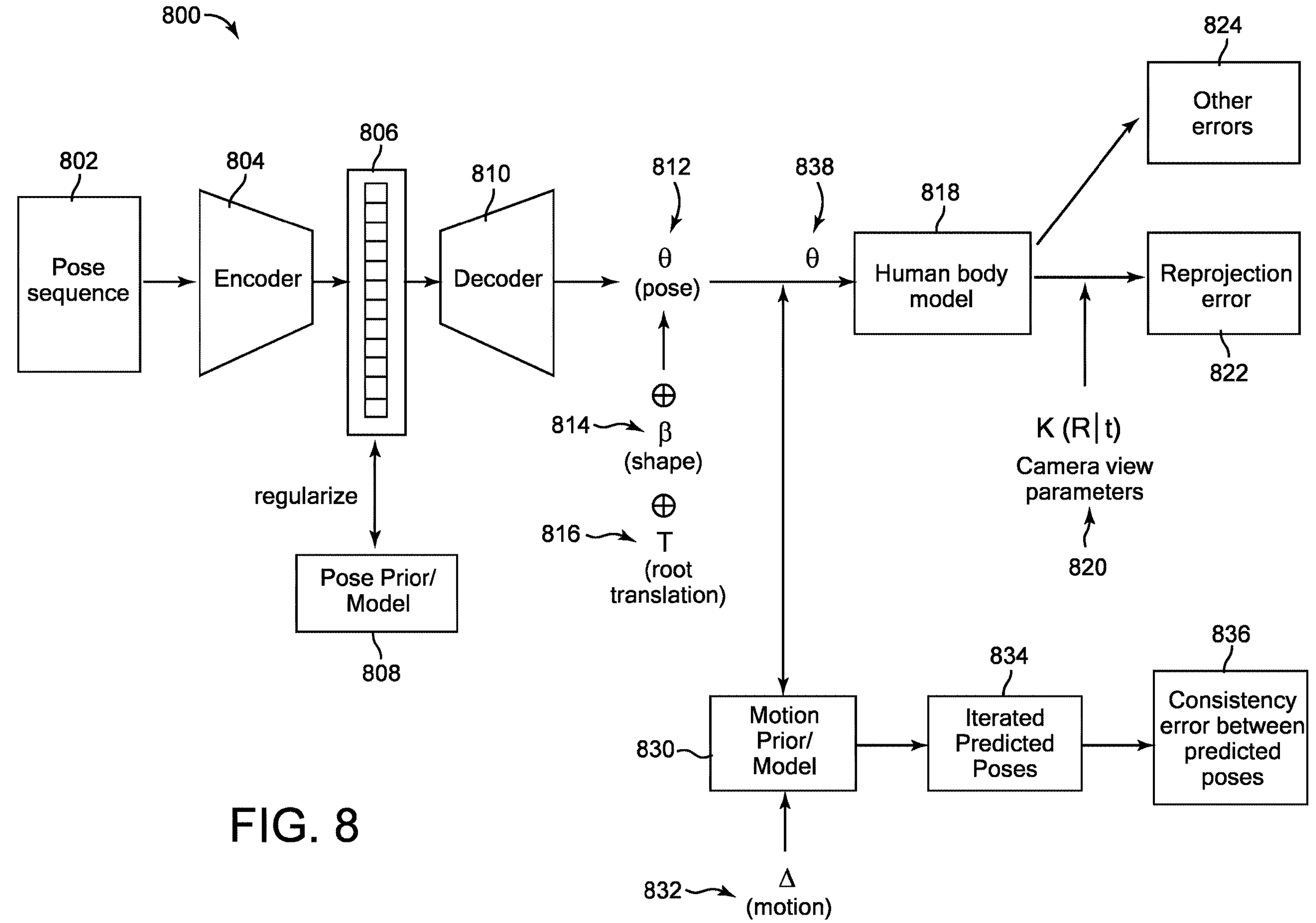
FIG. 8 is a block diagram of an example pipeline that implements the method of FIG. 6 to update a pose sequence, in accordance with some implementations.

FIG. 8 is a block diagram illustrating an example pipeline 800 that implements the method 600 of FIG. 6 to update parameters of a pose sequence to produce a refined pose sequence that includes smoothed motion, according to some implementations.

In the described example, several components are similar to corresponding components of the pipeline of FIG. 5 which implements method 400 of FIG. 4. Pose sequence 802 can be a pose sequence provided by block 206 (or block 204) of FIG. 2. Pose sequence 802 is input to encoder 804, which encodes the joint angles of pose sequence 802 into the latent space of the human pose prior, to produce pose prior parameters 806. Pose prior parameters 806 are provided by pose prior/model 808. Pose prior parameters 806 are decoded by decoder 810 to produce pose parameters 812, which include the joint angles of the poses of the pose sequence. Shape parameters 814 and root translation parameters 816 are also provided that describe the shape and location of the poses in the pose sequence.

The joint angles of the pose parameters 812 can be used to provide inputs to a human motion model 830 that includes a human motion prior, as described above. For example, joint velocities of the pose sequence can be determined from the joint angles and positions, and the velocities are provided to the motion model 830 which provides a regularized motion for the pose sequence, e.g., using a Gaussian distribution. A delta parameter 832 is added to a pose vector provided by the motion model 830 to provide an adjustable parameter. The pose vector adjusts the joint angles in the pose parameters 812 to determine pose parameters 838. In addition, the motion model determines predicted poses 834 in multiple iterations, where a chain of predicted poses is determined for each pose of the pose sequence.

Pose parameters 838 (adjusted by the output of the motion model 830), shape parameters 814, and root translation parameters 816 are converted to human body model parameters of the human body model 818, which provides a 3D mesh for each pose of the pose sequence. The 3D meshes are projected onto the 2D images of the corresponding video frames based on camera view parameters 820, which include intrinsic camera parameters (K) and extrinsic camera parameters (rotation R and translation t).

Errors determined by the pipeline include reprojection error 822 based on comparing joint positions of the projected 2D model to the joints of the person image in the corresponding video frame, and other errors 824 based on body model errors such as floating distance of the body model above a floor plane, distance of the body model below the floor plane, off-balance tilt of the body model, high velocity of joints and body model, implausible shape and joint rotation, etc. Consistency errors 836 are also determined based on the predicted poses 834 from the motion model 830. The deviation between corresponding predicted poses is determined as described above.

These errors, and cost functions that penalize the errors, are used to jointly adjust the parameters of the system to reduce the errors. For example, the delta parameter 832 can be adjusted to reduce consistency errors 836 (and other errors it may affect via joint angle changes). In later iterations, the same process provides errors that reduce and converge to provide an updated pose sequence that more accurately depicts the body movement in the input video, including more realistic motion.

In various implementations, various blocks of methods 200, 300, 400, and/or 600 may be combined, split into multiple blocks, performed in parallel, or performed asynchronously. In some implementations, one or more blocks of these methods may not be performed or may be performed in a different order than shown in these figures. Methods 200, 300, 400, and/or 600, or portions thereof, may be repeated any number of times using additional inputs.

Various implementations as described herein are implemented with specific user permission for use of user data, e.g., videos, avatar data, etc. The user is provided with a user interface that includes information about how the user's information is collected, stored, and analyzed, and enables the user to control such use of the user's information. For example, the user interface requires the user to provide permission to use any information associated with the user. The user is informed that the user information may be deleted by the user, and the user may have the option to choose what types of information are provided for different uses. The use of the information is in accordance with applicable regulations and the data is stored securely. Data collection is not performed in certain locations and for certain user categories (e.g., based on age or other demographics), the data collection is temporary (i.e., the data is discarded after a period of time), and the data is not shared with third parties. Some of the data may be anonymized, aggregated across users, or otherwise modified so that specific user identity cannot be determined.

Various implementations described herein may include obtaining data from various sensors in a physical environment (e.g., video cameras), analyzing such data, and providing user interfaces. Data collection is performed only with specific user permission and in compliance with applicable regulations. The data are stored in compliance with applicable regulations, including anonymizing or otherwise modifying data to protect user privacy. Users are provided clear information about data collection, storage, and use, and are provided options to select the types of data that may be collected, stored, and utilized. Further, users control the devices where the data may be stored (e.g., user device only; client+server device; etc.) and where the data analysis is performed (e.g., user device only; client+server device; etc.). Data are utilized for the specific purposes as described herein. No data is shared with third parties without express user permission.

FIG. 9 is a block diagram of an example computing device 900 which may be used to implement one or more features described herein, in accordance with some implementations. In one example, device 900 may be used to implement a computer device (e.g., 102, 110, and/or 116 of FIG. 1), and perform appropriate method implementations described herein. Computing device 900 can be any suitable computer system, server, or other electronic or hardware device. For example, the computing device 900 can be a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 900 includes a processor 902, a memory 904, input/output (I/O) interface 906, and audio/video input/output devices 914 (e.g., display screen, touchscreen, display goggles or glasses, audio speakers, microphone, etc.).

Processor 902 can be one or more processors and/or processing circuits to execute program code and control basic operations of the device 900. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 904 is typically provided in device 900 for access by the processor 902, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 902 and/or integrated therewith. Memory 904 can store software operating on the server device 900 by the processor 902, including an operating system 908, an animation engine 910, and associated data 912. In some implementations, animation engine 910 (and/or other engines) can include instructions that enable processor 902 to perform functions described herein, e.g., some or all of the methods and implementations of FIGS. 2-8.

For example, memory 904 can include software instructions for animation engine 910 that can provide machine learning model training and/or pose sequence determination features as described herein, e.g., for an online gaming platform 102 or other device or system. Any of software in memory 904 can alternatively be stored on any other suitable storage location or computer-readable medium. Various machine learning models and other models used in described features can be stored in memory 904 and/or other connected storage devices, e.g., an initialization machine learning model 916 (e.g., used in block 204), a human pose prior 918, a human motion prior 920 (e.g., human motion model), and/or other models 922. Further, memory 904 (and/or other connected storage device(s)) can store instructions and data used in the features described herein, e.g., video data, training data, pose sequences, human body model parameters, other parameters used by machine learning models, priors, etc., 3D meshes, cost functions, etc. Memory 904 and any other type of storage (magnetic disk, optical disk, magnetic tape, or other tangible media) can be considered "storage" or "storage devices."

I/O interface 906 can provide functions to enable interfacing the server device 900 with other systems and devices. For example, network communication devices, storage devices (e.g., memory and/or data store 108), and input/output devices can communicate via interface 906. In some implementations, the I/O interface can connect to interface devices including input devices (keyboard, gamepad or other game controller, pointing device, touchscreen, microphone, camera, scanner, etc.) and/or output devices (display device, speaker devices, printer, motor, etc.).

For ease of illustration, FIG. 9 shows one block for each of processor 902, memory 904, I/O interface 906, software blocks 908 and 910, and database 912. These blocks may represent one or more processors or processing circuitries, operating systems, memories, I/O interfaces, applications, and/or software modules. In other implementations, device 900 may not have all of the components shown and/or may have other elements including other types of elements instead of, or in addition to, those shown herein. While the online gaming platform 102 may be described as performing operations as described in some implementations herein, any suitable component or combination of components of online gaming platform 102 or similar system, or any suitable processor or processors associated with such a system, may perform the operations described.

A user device can also implement and/or be used with features described herein. Example user devices can be computer devices including some similar components as the device 900, e.g., processor(s) 902, memory 904, and I/O interface 906. An operating system, software and applications suitable for the client device can be provided in memory and used by the processor. The I/O interface for a client device can be connected to network communication devices, as well as to input and output devices, e.g., a microphone for capturing sound, a camera for capturing images or video, audio speaker devices for outputting sound, a display device for outputting images or video, or other output devices. A display device within the audio/video input/output devices 914, for example, can be connected to (or included in) the device 900 to display images pre- and post-processing as described herein, where such display device can include any suitable display device, e.g., an LCD, LED, or plasma display screen, CRT, television, monitor, touchscreen, 3-D display screen, headset, projector, or other visual display device. Some implementations can provide an audio output device, e.g., voice output or synthesis that speaks text.

The methods, blocks, and/or operations described herein can be performed in a different order than shown or described, and/or performed simultaneously (partially or completely) with other blocks or operations, where appropriate. Some blocks or operations can be performed for one portion of data and later performed again, e.g., for another portion of data. Not all of the described blocks and operations need be performed in various implementations. In some implementations, blocks and operations can be performed multiple times, in a different order, and/or at different times in the methods.

In some implementations, some or all of the methods can be implemented on a system such as one or more client devices. In some implementations, one or more methods described herein can be implemented, for example, on a server system, and/or on both a server system and a client system. In some implementations, different components of one or more servers and/or clients can perform different blocks, operations, or other parts of the methods.

One or more methods described herein (e.g., methods 200, 300, 400, and/or 600) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") executing on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method comprising:

determining, by at least one processor, a first pose sequence of a human body model based on image data of frames of an input video, wherein the frames include pixels depicting movement of a person, and wherein the first pose sequence includes a plurality of poses of the human body model that correspond to the frames of the input video, wherein each pose is described by parameters including joint angles of joints of the human body model;

updating, by the at least one processor, the first pose sequence to produce a second pose sequence of the human body model, wherein the updating includes, over a plurality of iterations:

determining joint velocities of joints of the human body model of a processed pose sequence, wherein the processed pose sequence is initially the first pose sequence;

determining, in parallel, a respective chain of predicted poses from each of multiple poses of the processed pose sequence using a human motion model that is trained to adjust joint angles of joints of the human body model of poses of the respective chain toward plausible motions of a human body, wherein determining the respective chain of predicted poses from each of the multiple poses includes encoding the joint velocities of the poses of the respective chain into parameters of a latent space of a human motion prior of the human motion model and decoding the parameters to provide next poses following individual poses of the respective chain;

comparing corresponding predicted poses between different chains of the respective chains of predicted poses, wherein the corresponding predicted poses correspond to a same pose of the first pose sequence; and based on the comparison, adjusting the joint angles of the human body model of the poses of the processed pose sequence, wherein the processed pose sequence is the second pose sequence after the plurality of iterations; and applying the second pose sequence to a computer model in a computer-generated environment to cause an animation of the computer model based on the second pose sequence and corresponding to the movement of the person in the input video.

2. The computer-implemented method of claim 1, wherein each predicted pose in the respective chain is determined based on a previous pose in the respective chain.

3. The computer-implemented method of claim 2, wherein determining the predicted poses from each of the multiple poses includes, for each predicted pose, encoding joint velocities of the previous pose into the parameters of the latent space of the human motion prior and decoding the parameters to obtain the predicted pose.

4. The computer-implemented method of claim 1, wherein updating the first pose sequence includes determining a consistency error between the joints of the human body model of the corresponding predicted poses, wherein adjusting the joint angles is based on the consistency error.

5. The computer-implemented method of claim 1, wherein determining the respective chain of predicted poses from each of the multiple poses includes adding a delta velocity parameter to the parameters of the latent space of the human motion prior, and further comprising adjusting the delta velocity parameter based on the comparison of the corresponding predicted poses.

6. The computer-implemented method of claim 1, wherein updating the first pose sequence to produce the second pose sequence over the plurality of iterations is stopped in response to deviations between the corresponding predicted poses meeting one or more thresholds.

7. The computer-implemented method of claim 1, wherein determining the joint velocities includes determining a distance that each joint of one or more joints moves between a predicted pose and a previous pose of the processed pose sequence.

8. The computer-implemented method of claim 1, wherein the human motion model uses a Gaussian probability distribution of possible pose transitions to adjust the joint angles of the poses of the respective chain toward plausible motions of the human body.

9. The computer-implemented method of claim 1, wherein determining the first pose sequence includes determining the first pose sequence using at least one machine learning model, wherein the at least one machine learning model is trained on a plurality of videos depicting movement of persons, and wherein determining the first pose sequence further comprises:

determining, by the at least one processor, an initial pose sequence based on the at least one machine learning model; and updating, by the at least one processor, the initial pose sequence to produce the first pose sequence, wherein updating the initial pose sequence to produce the first pose sequence includes:

determining, by the at least one processor, positions of joints of the person depicted in the frames of the input video;

projecting the poses of the human body model from a three-dimensional space to a two-dimensional plane;

determining a reprojection error based on differences between positions of joints of the projected poses of the human body model and the positions of joints of the person depicted in the frames of the input video; and iteratively adjusting one or more parameters of the initial pose sequence based on the reprojection error to produce the first pose sequence.

10. The computer-implemented method of claim 9, further comprising determining one or more additional errors in poses of the initial pose sequence, wherein the additional errors include one or more of:

an off-balance orientation of one or more of the poses in the initial pose sequence;

a position of at least one of the poses of the initial pose sequence relative to a floor plane;

joint velocities of body joints in the initial pose sequence being over a threshold; or a body shape of the human body model of the initial pose sequence being outside a particular range of shapes, wherein iteratively adjusting the one or more parameters of the initial pose sequence is further based on the additional errors.

11. A system comprising:

at least one processor; and a memory coupled to the at least one processor, with software instructions stored thereon that, when executed by the at least one processor, cause the at least one processor to perform operations including:

determining, using a machine learning model, a first pose sequence of a human body model based on image data in frames of an input video, wherein the frames include pixels depicting movement of a person, and wherein the first pose sequence includes a plurality of poses of the human body model that correspond to the frames of the input video;

updating the first pose sequence to produce a second pose sequence, wherein updating the first pose sequence includes:

projecting the plurality of poses of the human body model from a three-dimensional space to a two-dimensional plane;

determining a reprojection error based on differences between positions of joints of the human body model in the projected poses and positions of joints of the person in the frames of the input video; and adjusting one or more parameters of the first pose sequence based on the reprojection error to produce the second pose sequence, wherein one or more constraints are imposed on the adjusting the one or more parameters, the one or more constraints including constraining movement of a camera view of the human body model;

updating the second pose sequence to produce a third pose sequence of the human body model, wherein updating the second pose sequence includes, over a plurality of iterations:

determining joint velocities of joints of the human body model of a processed pose sequence, wherein the processed pose sequence is initially the second pose sequence;

determining a respective chain of predicted poses from each of multiple poses of the processed pose sequence using a human motion model that is trained to adjust joint angles of the human body model of poses of the respective chain toward plausible motions of a human body;

comparing corresponding predicted poses between different chains of the respective chains of predicted poses, wherein the corresponding predicted poses correspond to a same pose of the second pose sequence; and based on the comparison, adjusting the joint angles of the human body model of the poses of the processed pose sequence, wherein the processed pose sequence is the third pose sequence after the plurality of iterations; and applying poses that are based on the second third pose sequence to a computer model in a computer-generated environment, wherein applying the poses causes an animation of the computer model that corresponds to the movement of the person in the input video.

12. The system of claim 11, wherein the operation of adjusting the one or more parameters includes iteratively adjusting the one or more parameters based on the reprojection error until the reprojection error is below a threshold, and wherein the one or more parameters include joint angle parameters, body shape parameters, root translation parameters, and camera view parameters.

13. The system of claim 11, wherein the one or more constraints further include a horizontal plane on which the human body model is positioned for the poses in the second pose sequence.

14. The system of claim 11, wherein the one or more constraints further include restricting the movement of the camera view to five degrees of freedom, wherein the five degrees of freedom exclude rotation of the camera view about a vertical axis.

15. The system of claim 11, wherein the operation of adjusting the one or more parameters is additionally based on one or more cost functions, wherein the one or more cost functions include a cost function that assigns a cost to loss of contact of the human body model with a horizontal floor, wherein the loss of contact includes at least one of:

movement of the human body model through a floor plane of the horizontal floor, or movement of feet portions of the human body model at least a threshold distance above the floor plane of the horizontal floor.

16. The system of claim 11, wherein the operation of adjusting the one or more parameters is additionally based on one or more cost functions, wherein the one or more cost functions include a cost function that assigns a cost to a center of mass of the human body model, for a threshold period of time, being tilted from a vertical direction by at least a threshold angle.

17. The system of claim 11, wherein the operation of adjusting the one or more parameters is additionally based on one or more cost functions, wherein the one or more cost functions include a cost function that assigns a cost to sequential poses of the first pose sequence in which the human body model or a portion of the human body model moves between the sequential poses at a speed over a threshold velocity.

18. The system of claim 11, wherein determining the respective chain of predicted poses from each of the multiple poses includes encoding the joint velocities of the poses of the respective chain into parameters of a latent space of a human motion prior of the human motion model and decoding the parameters to provide next poses of the respective chain following individual poses of the respective chain, wherein the human motion model uses a Gaussian probability distribution of possible pose transitions to adjust the joint angles of the poses of the respective chain toward plausible motions of the human body.

19. The system of claim 11, wherein updating the first pose sequence further includes determining, using an image detector machine learning model, the positions of joints of the person depicted in the frames of the input video.

20. The system of claim 11, wherein the operation of determining the first pose sequence includes using a trained regression model trained on a plurality of videos depicting movement of persons, wherein the trained regression model predicts relative joint angles of body parts and excludes prediction of body shape and root translation of the human body model in three-dimensional space.

* * * * *